United States Patent
Okamoto et al.

(10) Patent No.: US 7,446,158 B2
(45) Date of Patent: Nov. 4, 2008

(54) CURABLE COMPOSITION

(75) Inventors: Toshihiko Okamoto, Takasago (JP); Katsuyu Wakabayashi, Settsu (JP)

(73) Assignee: Kaneka Corporation, Osaka (JP)

( * ) Notice: Subject to any disclaimer, the term of this patent is extended or adjusted under 35 U.S.C. 154(b) by 47 days.

(21) Appl. No.: 11/579,726

(22) PCT Filed: Apr. 25, 2005

(86) PCT No.: PCT/JP2005/007803

§ 371 (c)(1),
(2), (4) Date: Nov. 6, 2006

(87) PCT Pub. No.: WO2005/108494

PCT Pub. Date: Nov. 17, 2005

(65) Prior Publication Data

US 2007/0219299 A1    Sep. 20, 2007

(30) Foreign Application Priority Data

| May 7, 2004 | (JP) | ............................ 2004-139110 |
| May 7, 2004 | (JP) | ............................ 2004-139111 |
| May 17, 2004 | (JP) | ............................ 2004-146972 |
| May 17, 2004 | (JP) | ............................ 2004-146973 |
| May 17, 2004 | (JP) | ............................ 2004-146974 |
| May 17, 2004 | (JP) | ............................ 2004-146976 |
| May 17, 2004 | (JP) | ............................ 2004-146977 |

(51) Int. Cl.
*C08F 30/08* (2006.01)

(52) U.S. Cl. ..................... 526/279; 516/319; 516/328

(58) Field of Classification Search ............... 526/279, 526/319, 328; 525/477
See application file for complete search history.

(56) References Cited

U.S. PATENT DOCUMENTS 6,642,309 B2    11/2003    Komitsu et al.

FOREIGN PATENT DOCUMENTS

| JP | 5-311063 A | 11/1993 |
| JP | 05-331063 | * 11/1993 |
| JP | 2001-302929 A | 10/2001 |
| JP | 2001-302930 A | 10/2001 |
| JP | 2001-302934 A | 10/2001 |
| JP | 2002-249672 | * 9/2002 |
| JP | 2002-249672 A | 9/2002 |
| JP | 2003-327856 | * 11/2003 |
| JP | 2003-327856 A | 11/2003 |
| JP | 2004-2757 A | 1/2004 |
| JP | 2004-59870 A | 2/2004 |
| JP | 2004-83606 A | 3/2004 |
| JP | 2004-83895 A | 3/2004 |
| WO | WO 01/49789 A2 | 7/2001 |

* cited by examiner

*Primary Examiner*—Ling-Siu Choi
(74) *Attorney, Agent, or Firm*—Sughrue Mion, PLLC

(57) ABSTRACT

There is provided a curable composition being free from coloration and having excellent curability, adhesion and weather resistance by use of a non-organotin catalyst.

A curable composition comprising (A) a polyoxyalkylene polymer and/or a (meth)acrylate polymer containing a silicon-containing group being capable of crosslinking by forming siloxane bonds, (B) a titanium chelate coordinated with β-ketoester, and (C) a photostabilizer, wherein a main component of the photostabilizer (C) is a photostabilizer (C-1) having no benzotriazole ring.

20 Claims, No Drawings

CURABLE COMPOSITION

TECHNICAL FIELD

The present invention relates to a curable composition comprising a polyoxyalkylene polymer and/or a (meth)acrylate polymer (hereinafter referred to as "organic polymer") containing a silicon-containing group (hereinafter referred to as a "reactive silicon group") which has hydroxyl group or a hydrolyzable group bonded to the silicon atom and which is capable of crosslinking by forming siloxane bonds.

BACKGROUND ART

It is known that an organic polymer having at least one reactive silicon group in the molecule undergoes crosslinking by formation of siloxane bonds accompanying a hydrolysis reaction or the like of the reactive silicon group with moisture or the like even at room temperature, and a rubber-like cured article can be obtained.

Among the polymers having a reactive silicon group, organic polymers in which the main chain skeleton is a polyoxyalkylene polymer and/or a (meth)acrylate polymer are disclosed in (Patent Document 1), (Patent Document 2) and the like. Those polymers have already been industrially produced, and are widely used in applications to sealants, adhesives, coatings and the like.

Curable compositions comprising the above described organic polymers having a reactive silicon group are cured by using silanol condensation catalysts, and usually organotin catalysts having a carbon-tin bond such as dibutyltin bis(acetylacetonate) are widely used. However, in recent years, toxicity of organotin catalysts is pointed out, and development of non-organotin catalysts are demanded.

Dealcoholization type silicone compositions using organic titanates as a non-organotin catalyst are available on the market, and are widely used in a variety of applications. This technique is disclosed in (Patent Document 3), (Patent Document 4) and the like.

However there are relatively few examples of adding an organic titanates to organic polymers containing a reactive silicon group. Those examples are disclosed in (Patent Document 5), (Patent Document 6), (Patent Document 7), (Patent Document 8), (Patent Document 9), (Patent Document 10), (Patent Document 11), (Patent Document 12), (Patent Document 13) and (Patent Document 14).

On the other hand, as disclosed in (Patent Document 15), (Patent Document 16), (Patent Document 17), (Patent Document 18), (Patent Document 19), (Patent Document 20), (Patent Document 21), (Patent Document 22), (Patent Document 23), (Patent Document 24) and the like, sometimes to organic polymers containing a reactive silicon group are added various photostabilizers for the purpose of improving weather resistance.

Patent Document 1: JP-52-73998A
Patent Document 2: JP-59-74149A
Patent Document 3: JP-39-27643B (U.S. Pat. No. 3,175,993)
Patent Document 4: U.S. Pat. No. 3,334,067
Patent Document 5: JP-58-17154A (JP-3-57943B)
Patent Document 6: JP-62-146959A (JP-5-45635B)
Patent Document 7: JP-5-311063A
Patent Document 8: JP-2001-302929A
Patent Document 9: JP-2001-302930A
Patent Document 10: JP-2001-302931A
Patent Document 11: JP-2001-302934A
Patent Document 12: JP-2001-348528A
Patent Document 13: JP-2002-249672A
Patent Document 14: JP-2003-165916A
Patent Document 15: JP-2001-19842A
Patent Document 16: JP-61-233043A
Patent Document 17: JP-5-287186A
Patent Document 18: JP-5-70531A
Patent Document 19: JP-9-194731A
Patent Document 20: JP-2002-129004A
Patent Document 21: JP-11-172110A
Patent Document 22: JP-11-21442A
Patent Document 23: JP-2000-273439A
Patent Document 24: JP-2001-271057A

DISCLOSURE OF INVENTION

Problem to be Solved by the Invention

The present inventors have found that in the case where a titanium chelate is used as a curing catalyst for a polyoxyalkylene polymer and/or a (meth)acrylate polymer containing a reactive silicon group, there is a problem that by adding a photostabilizer having a benzotriazole ring, curability is degraded and further the composition is remarkably colored.

It is well known that the above described reactive silicon group-containing polyoxyalkylene polymers prepared using an organotin catalyst has good adhesion to various articles to be adhered, but in some cases, sufficient adhesion cannot be obtained for organic articles to be hardly adhered such as acrylic resins.

It is an object of the present invention to provide a curable composition comprising a reactive silicon group-containing polyoxyalkylene polymer and/or (meth)acrylate polymer as a main component, being free from coloration and having satisfactory curability, adhesion and weather resistance by use of a non-organotin catalyst.

MEANS TO SOLVE THE PROBLEM

As a result of a diligent investigation to solve such problems, the present inventors perfected the present invention by discovering that a curable composition being free from coloration and having satisfactory curability, adhesion and weather resistance can be obtained by use of a titanium chelate (B) having a specific structure as a curing catalyst for the polymer and further by use of a photostabilizer (C-1) having a specific structure as a main component of the photostabilizer (C), although the catalyst concerned is a non-organotin catalyst.

Namely, the present invention relates to a curable composition comprising:
(A) a polyoxyalkylene polymer and/or a (meth)acrylate polymer containing a silicon-containing group being capable of crosslinking by forming siloxane bonds,
(B) a titanium chelate represented by the following general formula (1) or (2), and
(C) a photostabilizer;
characterized in that a main component of the photostabilizer (C) is a photostabilizer (C-1) having no benzotriazole ring.

General formula (1):

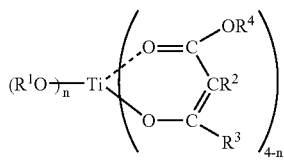

wherein each of n $R^1$s is independently a substituted or unsubstituted hydrocarbon group having 1 to 20 carbon atoms, each of (4-n) $R^2$s is independently hydrogen atom or a substituted or unsubstituted hydrocarbon group having 1 to 20 carbon atoms, each of (4-n) $R^3$s and (4-n) $R^4$s is independently a substituted or unsubstituted hydrocarbon group having 1 to 20 carbon atoms, n is 0, 1, 2 or 3.

General formula (2):

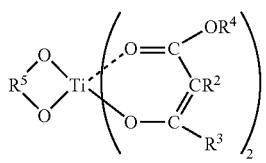

wherein $R^2$, $R^3$ and $R^4$ are the same as defined above, $R^5$ is a substituted or unsubstituted divalent hydrocarbon group having 1 to 20 carbon atoms.

It is desirable that the curable composition of the present invention does not contain a photostabilizer (C-2) having a benzotriazole ring as the photostabilizer (C). However when the curable composition contains a photostabilizer (C-2) having a benzotriazole ring as the photostabilizer (C), the content of (C-2) is desirably less than 0.1 part by weight with respect to 100 parts by weight of the polymer (A).

The polymer (A) is preferably a polyoxyalkylene polymer and/or a (meth)acrylate polymer containing a silicon-containing group being capable of crosslinking by forming siloxane bonds.

The glass transition temperature of the polymer (A) is preferably not more than 20° C.

Example of the photostabilizer (C-1) having no benzotriazole ring includes preferably at least one kind selected from benzoate ultraviolet absorbers, triazine ultraviolet absorbers, cyano acrylate ultraviolet absorbers, benzophenone ultraviolet absorbers and hindered amine photostabilizers, and more preferably benzoate ultraviolet absorbers and/or hindered amine photostabilizers.

Additionally, the above described hindered amine photostabilizers are preferably hindered amine photostabilizers having no —NH— groups.

As a preferred mixing ratio of (A), (B) and (C-1), with respect to 100 parts by weight of the polymer (A) are mixed the titanium chelate (B) in an amount of from 0.1 to 20 parts by weight and the photostabilizer (C-1) having no benzotriazole ring in an amount of from 0.1 to 10 parts by weight.

Additionally, preferred embodiments of the curable composition of the present invention are sealants or adhesives comprising any of the above described curable compositions.

EFFECT OF THE INVENTION

The curable composition of the present invention is free from coloration and having excellent curability, adhesion and weather resistance by use of a non-organotin catalyst.

BEST MODE FOR CARRYING OUT THE INVENTION

The present invention is then explained below in detail.

In the present invention, the polyoxyalkylene polymer having a reactive silicon group and/or the (meth)acrylate polymer having a reactive silicon group (hereinafter referred to as "organic polymer") are used as the component (A). By using the polyoxyalkylene polymer and/or the (meth)acrylate polymer as a main chain skeleton of the polymer of the component (A), a satisfactory adhesion can be achieved. Additionally, when a curable composition is prepared using a titanium catalyst as the component (B) of the present invention, there is a tendency that deep-part curability of the obtained composition is lowered depending on an added amount thereof. Accordingly, polyoxyalkylene polymers and (meth)acrylate polymers as used for the component (A) of the present invention are preferable because they are high in moisture permeability and excellent in deep-part curability in the case of a one-component type composition, and polyoxyalkylene polymers are more preferable.

No particular constraint is imposed on the glass transition temperature of the organic polymer of the component (A). The glass transition temperature is preferably not more than 20° C., more preferably not more than 0° C., particularly preferably not more than −20° C. If the glass transition temperature is higher than 20° C., in some cases, a viscosity increases and workability is lowered in wintertime or at a cold district or flexibility and elongation of the cured article are degraded. The above described glass transition temperature denotes values measured by DSC.

The reactive silicon group contained in the polyoxyalkylene polymer having a reactive silicon group and the (meth)acrylate polymer having a reactive silicon group is a group which has a hydroxyl group or a hydrolyzable group bonded to the silicon atom, and is capable of cross-linking through a reaction accelerated by a curing catalyst. Examples of the reactive silicon groups include groups represented by the general formula (3):

$$-(SiR^6{}_{2-b}X_bO)_m-SiR^7{}_{3-a}X_a \quad (3)$$

wherein each of $R^6$ and $R^7$ is independently an alkyl group having 1 to 20 carbon atoms, an aryl group having 6 to 20 carbon atoms, an aralkyl group having 7 to 20 carbon atoms or a triorganosiloxy group represented by $(R')_3SiO-$, where each of R's is independently a substituted or unsubstituted hydrocarbon group having 1 to 20 carbon atoms, each of Xs is independently hydroxyl group or a hydrolyzable group, b is 0, 1 or 2, a is 0, 1, 2 or 3, b and a are not zero at the same time, m is 0 or an integer of 1 to 19.

No particular constraint is imposed on the hydrolyzable group, and the hydrolyzable group may be a hydrolyzable group well known in the art. More specifically, examples of the hydrolyzable group include, for instance, hydrogen atom, a halogen atom, an alkoxy group, an acyloxy group, a ketoximate group, an amino group, an amide group, an acid amide group, an aminooxy group, a mercapto group, an alkenyloxy group and the like. Among these groups, hydrogen atom, an alkoxy group, an acyloxy group, a ketoximate group, an amino group, an amide group, an aminooxy group, a mercapto group and an alkenyloxy group are preferable and an alkoxy group is particularly preferable from the viewpoint that an alkoxy group is moderately hydrolyzable and easily handled.

One to three hydrolyzable groups and hydroxyl groups can bond to one silicon atom, and (a+Σb) is preferably within a range from 1 to 5. When two or more hydrolyzable groups and hydroxyl groups are bonded in the reactive silicon group, they may be the same or different.

The number of silicon atoms forming the reactive silicon group is one or more, and is preferably not more than 20 in the case of the silicon atoms connected by siloxane bonds.

Particularly reactive silicon groups represented by the general formula (4):

$$—SiR^7{}_{3-c}X_c \qquad (4)$$

wherein $R^7$ and X are the same as defined above, c is an integer of 1 to 3, are preferable because they are easily available.

Examples of $R^6$ and $R^7$ in the above described general formulae (3) and (4) include alkyl groups such as a methyl group and an ethyl group, cycloalkyl groups such as a cyclohexyl group, aryl groups such as a phenyl group, aralkyl groups such as a benzyl group, a triorganosiloxy group represented by $(R')_3SiO—$ where R' is a methyl group, a phenyl group or the like and the like group. Of these groups, a methyl group is particularly preferable.

More specific examples of the reactive silicon group include a trimethoxysilyl group, a triethoxysilyl group, a triisopropoxysilyl group, a dimethoxymethylsilyl group, a diethoxymethylsilyl group and a diisopropoxymethylsilyl group. A trimethoxysilyl group, a triethoxysilyl group and a dimethoxymethylsilyl group are more preferable and a trimethoxysilyl group is particularly preferable because these groups are high in activity and satisfactory curability can be obtained. Also from the viewpoint of storage stability, a dimethoxymethylsilyl group is particularly preferable. Additionally, a triethoxysilyl group is particularly preferable because the alcohol produced by the hydrolysis reaction of the reactive silicon group is ethanol and hence a triethoxysilyl group has a high safety.

The introduction of the reactive silicon group can be carried out by methods well known in the art. More specifically, examples of such methods include the followings.

(a) With an organic polymer having in the molecule functional groups such as hydroxy groups, an organic compound having both an active group exhibiting reactivity to the functional groups and an unsaturated group is reacted, to yield an unsaturated group-containing organic polymer. Alternatively, an unsaturated group-containing organic polymer is obtained by copolymerization of an epoxy compound having an unsaturated group with an organic polymer having in the molecule functional groups such as hydroxy groups. Then, a reactive silicon group-containing hydrosilane is reacted with the reaction product to be hydrosilylated.

(b) With an unsaturated group-containing organic polymer obtained similarly to the method described in (a), a mercapto group- and reactive silicon group-containing compound is reacted.

(c) With an organic polymer having in the molecule functional groups such as hydroxy groups, epoxy groups and isocyanate groups, a compound having a functional group exhibiting reactivity to the functional groups and a reactive silicon group is reacted.

Among the above methods, the method described in (a) or the method described in (c) in which a hydroxy group-terminated polymer is reacted with an isocyanate group- and reactive silicon group-containing compound is preferable because the method provides a high conversion rate at a relatively short reaction time. Additionally, the method described in (a) is particularly preferable because the reactive silicon group-containing organic polymer obtained by the method described in (a) is lower in viscosity and more satisfactory in workability than an organic polymer obtained by the method described in (c), and an organic polymer obtained by the method described in (b) is strong in odor due to mercaptosilane.

Examples of the hydrosilane compound used in the method described in (a) include halogenated silanes such as trichlorosilane, methyldichlorosilane, dimethylchlorosilane and phenyldichlorosilane; alkoxysilanes such as trimethoxysilane, triethoxysilane, methyldiethoxysilane, methyldimethoxysilane and phenyldimethoxysilane; acyloxysilanes such as methyldiacetoxysilane and phenyldiacetoxysilane; ketoximate silanes such as bis(dimethylketoximate)methylsilane and bis(cyclohexylketoximate)methylsilane and the like. However, the hydrosilane compound used in the method described in (a) is not limited to these compounds. Of these compounds, halogenated silanes and alkoxysilanes are preferable and in particular, alkoxysilanes are most preferable because the obtained curable compositions are moderately hydrolyzable and easily handled. Of the alkoxysilanes, methyldimethoxysilane is particularly preferable because it is easily available and curability, storage stability, elongation property and tensile strength of the curable composition containing the obtained organic polymer are high.

Examples of the synthesis method described in (b) include a method in which a mercapto group- and reactive silicon group-containing compound is introduced into the sites on the unsaturated bonds of an organic polymer by means of a radical addition reaction in the presence of a radical initiator and/or a radical generating source; however, the synthesis method concerned is not limited to these methods. Examples of the above described mercapto group- and reactive silicon group-containing compound include γ-mercaptopropyltrimethoxysilane, γ-mercaptopropylmethyldimethoxysilane, γ-mercaptopropyltriethoxysilane, γ-mercaptopropylmethyldiethoxysilane, mercaptomethyltrimethoxysilane, mercaptomethyltriethoxysilane, (mercaptomethyl)methyldiethoxysilane, (mercaptomethyl)methyldimethoxysilane and the like; however, the mercapto group- and reactive silicon group-containing compound is not limited to these compounds.

Examples of the method, of the methods described in (c), in which a hydroxy-terminated polymer is reacted with an isocyanate group- and reactive silicon group-containing compound include a method disclosed in Japanese Patent Laid-Open No. 3-47825; however, the method concerned is not limited to these methods. Examples of the above described isocyanate group- and reactive silicon group-containing compound include γ-isocyanatopropyltrimethoxysilane, γ-isocyanatopropylmethyldimethoxysilane, γ-isocyanatopropyltriethoxysilane, γ-isocyanatopropylmethyldiethoxysilane, (isocyanatomethyl)trimethoxysilane, (isocyanatomethyl)triethoxysilane, (isocyanatomethyl)dimethoxymethylsilane, (isocyanatomethyl)diethoxymethylsilane and the like; however, the compound concerned is not limited to these compounds.

In the case of silane compounds such as trimethoxysilane in which three hydrolyzable groups are bonded to one silicon atom, in some cases, disproportionation reaction proceeds. If disproportionation reaction proceeds, a very dangerous compound like dimethoxysilane is generated. However in the cases of γ-mercaptopropyltrimethoxysilane and γ-isocyanatepropyltrimethoxysilane, such a disproportionation reaction does not proceed. Accordingly, when using, as a silicon-containing group, a group such as a trimethoxysilyl group in which three hydrolyzable groups are bonded to one silicon atom, it is preferable to employ the synthesis method of (b) or (c).

The reactive silicon group-containing organic polymer may be a straight chain or may have branches, and the number average molecular weight thereof, measured by GPC relative to polystyrene standard, is preferably of the order of 500 to 100,000, more preferably 1,000 to 50,000, particularly preferably 3,000 to 30,000. When the number average molecular weight is less than 500, it tends to be disadvantageous from the viewpoint of an elongation property of the cured article, while when the number average molecular weight exceeds 100,000, it tends to be disadvantageous from the viewpoint of workability because the viscosity becomes high.

For the purpose of obtaining a rubber-like cured article having a high strength, a high elongation property and a low elastic modulus, it is recommended that the number of reactive silicon groups contained in the organic polymer is, on average in one polymer molecule, at least one, and preferably 1.1 to 5. When the average number of reactive silicon groups contained in the molecule is less than 1, the curability becomes insufficient, and hence a satisfactory rubber elasticity behavior can hardly be exhibited. The reactive silicon group may be located at the terminal of the main chain or at the terminal of the side chain, or at the both in the organic polymer molecule chain. In particular, when the reactive silicon group is located only at the terminal of the main chain, the effective network content in the organic polymer component contained in the finally formed cured article becomes large, so that it becomes easier to obtain a rubber-like cured article having a high strength, a high elongation property and a low elastic modulus.

The polyoxyalkylene polymer is essentially a polymer having the repeating units represented by the general formula (5):

$$—R^8—O— \quad (5)$$

wherein $R^8$ is a linear or branched alkylene group having 1 to 14 carbon atoms. In the general formula (5), $R^8$ is preferably a linear or branched alkylene group having 1 to 14 carbon atoms, and more preferably 2 to 4 carbon atoms. Examples of the repeating units represented by the general formula (5) include:

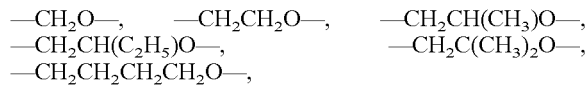

—CH$_2$O—, —CH$_2$CH$_2$O—, —CH$_2$CH(CH$_3$)O—, —CH$_2$CH(C$_2$H$_5$)O—, —CH$_2$C(CH$_3$)$_2$O—, —CH$_2$CH$_2$CH$_2$CH$_2$O—, and the like. The main chain skeleton of the polyoxyalkylene polymer may be formed of either only one type of repeating unit or two or more types of repeating units. In particular, in the case where the polymer is used for a sealant and the like, it is preferable that the main chain skeleton is formed of a polymer containing as the main component a propyleneoxide polymer because a polymer having such a main chain skeleton is amorphous and relatively low in viscosity.

Examples of the synthesis method of the polyoxyalkylene polymer include a polymerization method in the presence of an alkaline catalyst such as KOH; a polymerization method in the presence of a transition metal compound-porphyrin complex catalyst prepared by reacting an organoaluminum compound with porphyrin, disclosed in Japanese Patent Laid-Open No. 61-215623; polymerization methods in the presence of composite metal cyamide complex catalysts, disclosed in Japanese Patent Examined Publication Nos. 46-27250 and 59-15336, and U.S. Pat. Nos. 3,278,457, 3,278,458, 3,278,459, 3,427,256, 3,427,334, 3,427,335 and the like; a polymerization method in the presence of a catalyst composed of a polyphosphazene salt disclosed in Japanese Patent Laid-Open No. 10-273512, and a polymerization method in the presence of a catalyst composed of a phosphazene compound disclosed in Japanese Patent Laid-Open No. 11-060722. However, the method concerned is not limited to these methods.

Examples of the preparation method of the reactive silicon group-containing polyoxyalkylene polymer of the present invention include the methods disclosed in Japanese Patent Examined Publication Nos. 45-36319 and 46-12154, Japanese Patent Laid-Open Nos. 50-156599, 54-6096, 55-13767, 55-13468 and 57-164123, Japanese Patent Examined Publication No. 3-2450, and U.S. Pat. Nos. 3,632,557, 4,345,053, 4,366,307 and 4,960,844; and the methods of preparing polyoxyalkylene polymers each having a high molecular weight such that the number average molecular weight is not less than 6,000 and a narrow molecular weight distribution such that the Mw/Mn value is not more than 1.6, disclosed in Japanese Patent Laid-Open Nos. 61-197631, 61-215622, 61-215623, 61-218632, 3-72527, 3-47825 and 8-231707. However, the method concerned is not limited to these methods.

The above described reactive silicon group-containing polyoxyalkylene polymers may be used either each alone or in combinations of two or more thereof.

On the other hand, no particular constraint is imposed on the (meth)acrylate monomers constituting the main chains of the above described (meth)acrylate polymers, and various types can be used. Examples of the monomers concerned include (meth)acrylic acid monomers such as (meth)acrylic acid, methyl(meth)acrylate, ethyl(meth)acrylate, n-propyl(meth)acrylate, isopropyl(meth)acrylate, n-butyl(meth)acrylate, isobutyl(meth)acrylate, tert-butyl(meth)acrylate, n-pentyl(meth)acrylate, n-hexyl(meth)acrylate, cyclohexyl(meth)acrylate, n-heptyl(meth)acrylate, n-octyl(meth)acrylate, 2-ethylhexyl(meth)acrylate, nonyl(meth)acrylate, decyl(meth)acrylate, dodecyl(meth)acrylate, phenyl(meth)acrylate, tolyl(meth)acrylate, benzyl(meth)acrylate, 2-methoxyethyl(meth)acrylate, 3-methoxybutyl(meth)acrylate, 2-hydroxyethyl(meth)acrylate, 2-hydroxypropyl(meth)acrylate, stearyl(meth)acrylate, glycidyl(meth)acrylate, 2-aminoethyl(meth)acrylate, γ-(methacryloyloxypropyl)trimethoxysilane, γ-(methacryloyloxypropyl)dimethoxymethylsilane, methacryloyloxymethyltrimethoxysilane, methacryloyloxymethyltriethoxysilane, methacryloyloxymethyldimethoxymethylsilane, methacryloyloxymethyldiethoxymethylsilane, ethylene oxide adduct of (meth)acrylate, trifluoromethylmethyl meth)acrylate, 2-trifluoromethylethyl(meth)acrylate, 2-perfluoroethylethyl(meth)acrylate, 2-perfluoroethyl-2-perfluorobutylethyl(meth)acrylate, perfluoroethyl(meth)acrylate, trifluoromethyl(meth)acrylate, bis(trifluoromethylmethyl)(meth)acrylate, 2-trifluoromethyl-2-perfluoroethylethyl(meth)acrylate, 2-perfluorohexylethyl(meth)acrylate, 2-perfluorodecylethyl(meth)acrylate and 2-perfluorohexadecylethyl(meth)acrylate. For the above described (meth)acrylate polymers, (meth)acrylate monomers can be copolymerized with the following vinyl monomers. Examples of the vinyl monomers concerned include styrene monomers such as styrene, vinyltoluene, α-methylstyrene, chlorostyrene, styrenesulfonic acid and the salts thereof; fluorine-containing vinyl monomers such as perfluoroethylene, perfluoropropylene and fluorinated vinylidene; silicon-containing vinyl monomers such as vinyltrimethoxysilane and vinyltriethoxysilane; maleic anhydride, maleic acid, and monoalkyl esters and dialkyl esters of maleic acid; fumaric acid, and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile group-containing vinyl monomers such as acrylonitrile and methacrylonitrile; amide group-containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; and vinyl chloride, vinylidene chloride, allyl chloride and allyl alcohol. These monomers may be used each alone or two or more of these monomers may be copolymerized. Among these, from the viewpoint of the physical properties of the products, polymers formed of styrene monomers and (meth)acrylic acid monomers are preferable. More preferable are the (meth)acryl polymers formed of acrylate monomers and methacrylate monomers, and particularly preferable are the acryl polymers formed of acrylate monomers. For general construction applications, the butyl acrylate monomers are further preferable because compositions concerned each are required to have physical properties including a low viscosity, and the cured articles each are required to have physical properties including a low modulus, a high elongation property, a weather resistance and a heat resistance. On the other hand, for applications to vehicles and the like where oil resistance is required, copolymers made of ethyl acrylate as the main material are further preferable. The copolymers made of ethyl acrylate as the main material are excellent in oil resistance, but slightly tend to be poor in low-temperature property (low-temperature resistance); for the purpose of improving the low-temperature property thereof, a part of ethyl acrylates can be replaced with butyl acrylate. However, with the increase of the ratio of butyl acrylate, the satisfactory oil resistance comes to be degraded, so that for the application to the use requiring oil resistance, the ratio of butyl acrylate is set preferably to not more than 40%, and more preferably to not more than 30%. Additionally, it is also preferable to use 2-methoxyethyl acrylate and 2-ethoxyethyl acrylate which have side chain alkyl groups containing oxygen atoms introduced for the purpose of improving the low-temperature property and the like without degrading the oil resistance; in this connection, it is to be noted that the introduction of alkoxy groups having an ether bond in the side chains tends to degrade the heat resistance, so that the ratio of such an acrylate is preferably not more than 40% when heat resistance is required. It is possible to obtain appropriate polymers by varying the ratio in consideration of required physical properties such as oil resistance, heat resistance and low-temperature property according to the various applications and the required objectives. Examples of the polymers excellent in the balance between the physical properties including the oil resistance, heat resistance, low-temperature property and the like include a copolymer of ethyl acrylate/butyl acrylate/2-methoxyethyl acrylate (40 to 50/20 to 30/30 to 20 in a ratio by weight), this copolymer imposing no constraint on the polymers concerned. In the present invention, these preferable monomers can be copolymerized with other monomers, and moreover, block copolymerized with other monomers. In such cases, it is preferable that the preferable monomers are contained in an amount of not less than 40% in a ratio by weight. Incidentally, it is to be noted that in the above form of presentation, for example, "(meth)acrylic acid" means acrylic acid and/or methacrylic acid.

No particular constraint is imposed on the synthesis methods of the (meth)acrylate polymers, and the methods well known in the art can be applied. However, polymers obtained by the usual free radical polymerization methods using azo compounds and peroxides as polymerization initiators have a problem such that the molecular weight distribution values of the polymers are generally as large as not less than 2 and the viscosities of the polymers are high. Accordingly, it is preferable to apply living radical polymerization methods for the purpose of obtaining (meth)acrylate polymers being narrow in molecular weight distribution and low in viscosity, and moreover, having cross-linking functional groups at the molecular chain terminals in a high ratio.

Among "the living radical polymerization methods," "the atom transfer radical polymerization method" in which (meth)acrylate monomers are polymerized by use of an organic halogenated compound or a halogenated sulfonyl compound as an initiator and a transition metal complex as a catalyst has, in addition to the features of the above described "living radical polymerization methods," features such that the obtained polymer has halogen atoms at the terminals relatively favorable for the functional group conversion reaction and freedom for designing the initiator and the catalyst is wide, so that the atom transfer radical polymerization method is further preferable as a method for preparing (meth)acrylate polymers having particular functional groups. Examples of the atom transfer radical polymerization method include the method reported by Matyjaszewski et al. in Journal of the American Chemical Society (J. Am. Chem. Soc.), Vol. 117, p. 5614 (1995).

As a preparation method of a reactive silicon group-containing (meth)acrylate polymer, for example, Japanese Patent Examined Publication Nos. 3-14068 and 4-55444, and Japanese Patent Laid-Open No. 6-211922 and the like disclose preparation methods according to the free radical polymerization methods by using chain transfer agents. Additionally, Japanese Patent Laid-Open No. 9-272714 and the like disclose a preparation method according to the atom transfer radical polymerization method. However, the preparation method concerned is not limited to these methods.

The above described reactive silicon group-containing (meth)acrylate polymers may be used either each alone or in combinations of two or more thereof.

These reactive silicon group-containing organic polymers may be used either each alone or in combinations of two or more thereof. Specifically, there can be used organic polymers formed by blending two or more polymers selected from the group consisting of the reactive silicon group-containing polyoxyalkylene polymers, the reactive silicon group-containing saturated hydrocarbon polymers and the reactive silicon group-containing (meth)acrylate polymers.

The preparation methods of the organic polymers formed by blending the reactive silicon group-containing polyoxyalkylene polymers with the reactive silicon group-containing (meth)acrylate polymers are proposed in Japanese Patent Laid-Open Nos. 59-122541, 63-112642, 6-172631, 11-116763 and the like. However, the preparation method concerned is not limited to these methods. A preferable specific example is a preparation method in which a reactive silicon group-containing polyoxyalkylene polymer is blended with a copolymer formed of two (meth)acrylate monomer units: one (meth)acrylate monomer unit has the reactive silicon groups and alkyl groups having 1 to 8 carbon atoms, and the molecular chain is substantially represented by the following general formula (6):

wherein $R^9$ represents hydrogen atom or a methyl group, and $R^{10}$ represents an alkyl group having 1 to 8 carbon atoms; and the other (meth)acrylate monomer unit has alkyl groups having 10 or more carbon atoms and is represented by the following general formula (7):

wherein $R^9$ is the same as defined above, and $R^{11}$ represents an alkyl group having 10 or more carbon atoms.

In the above general formula (6), examples of $R^{10}$ include alkyl groups having 1 to 8 carbon atoms, preferably 1 to 4 carbon atoms and further preferably 1 to 2 carbon atoms such as a methyl group, an ethyl group, a propyl group, a n-butyl group, a t-butyl group and a 2-ethylhexyl group. It is also to be noted that the alkyl group of $R^{10}$ may represent either one type or admixtures of two or more types.

In the above general formula (7), examples of $R^{11}$ include long chain allyl groups having 10 or more carbon atoms, usually 10 to 30 carbon atoms, and preferably 10 to 20 carbon atoms such as a lauryl group, a tridecyl group, a cetyl group, a stearyl group and a behenyl group. It is also to be noted that the alkyl group of $R^{11}$ may represent, similarly to $R^{10}$, either one type or admixtures of two or more types.

The molecular chains of the above described (meth)acrylate copolymers are substantially formed of the monomer units represented by formulas (6) and (7): "substantially" as referred to here means that in the copolymer concerned, the sum content of the monomer unit of formula (6) and the monomer unit of formula (7) exceeds 50 wt %. The sum content of the monomer units of formulas (6) and (7) is preferably not less than 70 wt %.

Additionally, the abundance ratio by weight of the monomer unit of formula (6) to the monomer unit of formula (7) is preferably 95:5 to 40:60, and further preferably 90:10 to 60:40.

Examples of the monomer units other than the monomer units of formulas (6) and (7) which may be contained in the above described copolymer include α,β-unsaturated carboxylic acids such as acrylic acid and methacrylic acid; monomers containing amide groups such as acrylamide, methacrylamide, N-methylolacrylamide and N-methylolmethacrylamide, monomers containing epoxy groups such as glycidylacrylate and glycidylmethacrylate, and monomers containing amino groups such as diethylaminoethyl acrylate, diethylaminoethyl methacrylate and aminoethyl vinyl ether; and monomer units derived from acrylonitrile, styrene, α-methylstyrene, alkyl vinyl ethers, vinyl chloride, vinyl acetate, vinyl propionate and ethylene.

For the preparation method of the organic polymers formed by blending the (meth)acrylate polymers having the reactive silicon functional groups, there can be used additional methods in which (meth)acrylate monomers are polymerized in the presence of a reactive silicon group-containing polyoxypropylene polymer. These methods are disclosed specifically in Japanese Patent Laid-Open Nos. 59-78223, 60-228516, 60-228517 and the like. However, the method concerned is not limited to these methods.

The main chain skeleton of the organic polymer of the present invention may include other components such as binding urethane components as far as such inclusion does not largely impair the effect of the present invention.

No particular constraint is imposed on the binding urethane components. Examples thereof include groups (hereinafter referred to as amide segments) formed by a reaction of an isocyanate group with an active hydrogen group.

The above described amide segments are groups represented by the general formula (8):

wherein $R^{12}$ represents hydrogen atom or a substituted or unsubstituted organic group.

Examples of the above described amide segments include a urethane group formed by a reaction of an isocyanate group with hydroxyl group; a urea group formed by a reaction of an isocyanate group with an amino group; a thiourethane group formed by a reaction of an isocyanate group with a mercapto group; and the like. Additionally, in the present invention, groups formed by further reaction of an active hydrogen in the urethane group, urea group or thiourethane group with an isocyanate group are included in the groups of the general formula (8).

Example of an industrially easy method of preparing an organic polymer having both of an amide segment and a reactive silicon group is a method in which after or at the same time of reacting an organic polymer having an active hydrogen-containing group at the terminal with an excessive amount of polyisocyanate compound to yield a polymer having isocyanate groups at the terminals of polyurethane main chains, a part or the whole of isocyanate groups are reacted with a W group of the silicon compound represented by the general formula (9):

wherein $R^7$, X and c are the same as defined above; $R^{13}$ is a divalent organic group, more preferably a substituted or unsubstituted divalent hydrocarbon group having 1 to 20 carbon atoms; W is an active hydrogen-containing group selected from hydroxyl group, a carboxyl group, a mercapto group and an amino group (unsubstituted or mono-substituted). Known methods of preparing organic polymers in relation to this preparation method are disclosed in Japanese Patent Examined Publication No. 46-12154 (U.S. Pat. No. 3,632,557), Japanese Patent Laid-Open Nos. 58-109529 (U.S. Pat. No. 4,374,237), 62-13430 (U.S. Pat. No. 4,645,816), 8-53528 (EP Patent No. 0676403), and 10-204144 (EP Patent No. 0831108), Japanese Patent Laid-Open No. 2003-508561 (U.S. Pat. No. 6,197,912), Japanese Patent Laid-Open Nos. 6-211879 (U.S. Pat. No. 5,364,955), 10-53637 (U.S. Pat. No. 5,756,751), 11-100427, 2000-169544, 2000-169545, and 2002-212415, Japanese Patent No. 3313360, U.S. Pat. No. 4,067,844, U.S. Pat. No. 3,711,445, Japanese Patent Laid-Open No. 2001-323040 and the like.

Additionally, there are methods of preparation by reacting an organic polymer having an active hydrogen-containing group at the terminal with a reactive silicon group-containing isocyanate compound represented by the general formula (10):

wherein $R^7$, $R^{13}$, X and c are the same as defined above. Known methods of preparing organic polymers in relation to this preparation method are disclosed in Japanese Patent Laid-Open Nos. 11-279249 (U.S. Pat. No. 5,990,257), 2000-119365 (U.S. Pat. No. 6,046,270), 58-29818 (U.S. Pat. No. 4,345,053), 3-47825 (U.S. Pat. No. 5,068,304), 11-60724, 2002-155145, 2002-249538, WO03/018658, WO03/059981 and the like.

Examples of the organic polymers having an active hydrogen-containing group at the terminal include oxyalkylene polymers (polyether polyols) having hydroxyl group at the terminal and polyacryl polyols. Among them, polyether polyols are more preferable because a viscosity of the obtained organic polymers is low, workability is good, and adhesion and deep-part curability are good. Additionally polyacryl polyols are more preferable because weather resistance and heat resistance of the cured articles obtained from the organic polymers are good.

Polyether polyols prepared by any of preparation methods can be used, and preferred are polyether polyols having at least 0.7 hydroxyl group per a molecular terminal on average of the whole molecules. Specifically, examples thereof are oxyalkylene polymers prepared by using conventional alkali metal catalysts, oxyalkylene polymers prepared by reacting an initiator such as a polyhydroxy compound having at least two hydroxyl groups with alkylene oxide in the presence of a composite metal cyamide complex and cesium, and the like.

Of the above described polymerization methods, the method using a composite metal cyamide complex is preferable because oxyalkylene polymers having a lower degree of unsaturation, a narrow Mw/Mn, a lower viscosity and high acid resistance and weather resistance can be obtained.

Examples of the above described polyacryl polyols include polyols having an alkyl(meth)acrylate (co)polymer skeleton and containing hydroxy groups in the molecule. As the synthesis method to produce these polymers, the living radical polymerization method is preferable because this method can lead to narrow molecular weight distributions and low viscosities, and the atom transfer radical polymerization method is further preferable. Additionally, it is preferable to use a polymer based on the so-called SGO process which is obtained by continuously block-polymerizing an alkyl acrylate monomer at a high temperature under a high pressure, as described in Japanese Patent Laid-Open No. 2001-207157. Specifically, examples thereof include UH-2000 produced by Toagosei Co., Ltd., and the like.

Examples of the polyisocyanate compound include aromatic polyisocyanates such as toluene (tolylene) diisocyanate, diphenylmethane diisocyanate and xylylene diisocyanate; and aliphatic polyisocyanates such as isophorone diisocyanate and hexamethylene diisocyanate.

No particular constraint is imposed on the silicon compound of the general formula (9). Specifically, examples thereof include silanes having amino group such as γ-aminopropyltrimethoxysilane, N-(β-aminoethyl)-γ-aminopropyltrimethoxysilane, γ-(N-phenyl)aminopropyltrimethoxysilane, N-ethylaminoisobutyltrimethoxysilane, (N-cyclohexylaminomethyl)triethoxysilane, (N-cyclohexylaminomethyl)diethoxymethylsilane and (N-phenylaminomethyl)trimethoxysilane; silanes having hydroxy group such as γ-hydroxypropyltrimethoxysilane; silanes having mercapto group such as γ-mercaptopropyltrimethoxysilane; and the like. Additionally, as described in Japanese Patent Laid-Open Nos. 6-211879 (U.S. Pat. No. 5,364,955), 10-53637 (U.S. Pat. No. 5,756,751), 10-204144 (EP Patent No. 0831108), 2000-169544 and 2000-169545, there can be used Michael addition reaction products of various α,β-unsaturated carbonyl compounds and primary amino group-containing silanes and Michael addition reaction products of various (meth) acryloyl group-containing silanes and primary amino group-containing compounds as the silicon compounds of the general formula (9).

No particular constraint is imposed on the reactive silicon group-containing isocyanate compound of the general formula (10). Specifically, examples thereof include γ-trimethoxysilylpropylisocyanate, γ-triethoxysilylpropylisocyanate, γ-methyldimethoxysilylpropylisocyanate, γ-methyldiethoxysilylpropylisocyanate, trimethoxysilylmethylisocyanate, dimethoxymethylsilylmethylisocyanate and the like. Additionally, as described in Japanese Patent Laid-Open No. 2000-119365 (U.S. Pat. No. 6,046,270), a compound obtained by reacting the silicon compound of the general formula (9) with an excessive amount of the above described polyisocyanate compound can be used as the reactive silicon group-containing isocyanate compound of the general formula (10).

When amide segments contained in the main chain skeleton of the organic polymer of the present invention are abundant, the viscosity of the organic polymer becomes high and forms a composition poor in workability as the case may be. On the other hand, curability of the composition of the present invention tends to be enhanced by the amide segments contained in the main chain skeleton of the organic polymer. When the organic polymer having amide segments in its main skeleton is used as the component (A), the composition prepared in a combination of the polymer with the component (B) of the present invention is preferable because the composition has a quicker curability by use of a non-organotin catalyst. Accordingly, when the amide segments are contained in the main chain skeleton of the organic polymer, the average number of amide segments per molecule is preferably from 1 to 10, more preferably from 1.5 to 7, particularly preferably from 2 to 5. When the number of amide segments is less than 1, in some cases, curability becomes insufficient, and when the number of amide segments is more than 10, the organic polymer becomes high in viscosity and forms a composition poor in workability.

In the present invention, the titanium chelate represented by the following general formula (1) or (2) is used as the component (B).

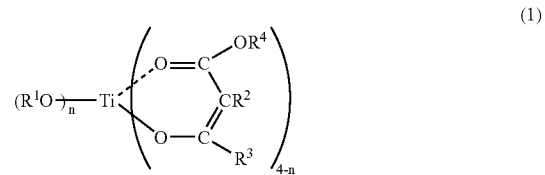

(1)

wherein each of n $R^1$s is independently a substituted or unsubstituted hydrocarbon group having 1 to 20 carbon atoms, each of (4-n) $R^2$s is independently hydrogen atom or a substituted or unsubstituted hydrocarbon group having 1 to 20 carbon atoms, each of (4-n) $R^3$s and (4-n) $R^4$s is independently a substituted or unsubstituted hydrocarbon group having 1 to 20 carbon atoms, n is 0, 1, 2 or 3.

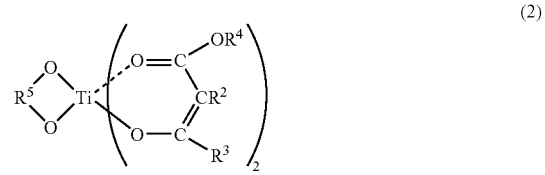

(2)

wherein $R^2$, $R^3$ and $R^4$ are the same as defined above, $R^5$ is a substituted or unsubstituted divalent hydrocarbon group having 1 to 20 carbon atoms.

This titanium chelate functions as a curing catalyst for the organic polymer of the component (A). Organotin compounds such as dibutyltin dilaurate and dibutyltin bis(acetylacetonate) have been so far used as a curing catalyst for the reactive silicon group-containing organic polymer of the component (A), but by using the titanium chelate (B) of the present invention, a curable composition having practical curing properties can be obtained although a curing catalyst is a non-organotin catalyst. Further, curability and storage stability are excellent as compared with the case of using other titanium catalysts having no chelate ligands. Additionally, by using the above described titanium chelate (B), a curable composition hardly colored can be obtained as compared with the case of using other titanium catalysts. Further as compared with the case of using other curing catalysts such as organotin catalysts, adhesion to articles to be hardly adhered such as acrylic resins can be enhanced.

Examples of the titanium chelates of the general formula (1) or (2) include titanium dimethoxidebis(ethylacetoacetate), titanium diethoxidebis(ethylacetoacetate), titanium diisopropoxidebis(ethylacetoacetate), titanium diisopropoxidebis(methylacetoacetate), titanium diisopropoxidebis(t-butylacetoacetate), titanium diisopropoxidebis(methyl-3-oxo-4,4-dimethylhexanoate), titanium diisopropoxidebis(ethyl-3-oxo-4,4,4-trifluorobutanoate), titanium di-n-butoxidebis(ethylacetoacetate), titanium diisobutoxidebis(ethylacetoacetate), titanium di-t-butoxidebis(ethylacetoacetate), titanium di-2-ethylhexoxidebis(ethylacetoacetate), titanium bis(1-methoxy-2-propoxide)bis(ethylacetoacetate), titanium bis(3-oxo-2-butoxide)bis(ethylacetoacetate), titanium bis(3-diethylaminopropoxide)bis(ethylacetoacetate), titanium triisopropoxide (ethylacetoacetate), titanium triisopropoxide (allylacetoacetate), titanium triisopropoxide (methacryloxyethylacetoacetate), 1,2-dioxyethanetitaniumbis(ethylacetoacetate), 1,3-dioxypropanetitaniumbis(ethylacetoacetate), 2,4-dioxypentanetitaniumbis(ethylacetoacetate), 2,4-dimethyl-2,4-dioxypentanetitaniumbis(ethylacetoacetate), titanium tetrakis(ethylacetoacetate), titanium bis(trimethylsiloxy)bis (ethylacetoacetate), titanium bis(trimethylsiloxy)bis(acetylacetonate), and the like. Of these titanium chelates, specifically preferred are titanium diethoxidebis(ethylacetoacetate), titanium diisopropoxidebis(ethylacetoacetate) and titanium dibutoxidebis(ethylacetoacetate) because those titanium chelates are easily available and also from the viewpoint of catalytic activity. More preferred is titanium diisopropoxidebis(ethylacetoacetate).

Preferred examples of the chelating agents capable of forming chelate ligands of the above described titanium chelates include β-ketoesters such as methyl acetoacetate, ethyl acetoacetate, t-butyl acetoacetate, allyl acetoacetate, (2-methacryloxyethyl)acetoacetate, methyl 3-oxo-4,4-dimethylhexanoate and ethyl 3-oxo-4,4,4-trifluorobutanoate. Among them, methyl acetoacetate and ethyl acetoacetate are more preferred from the viewpoint of curability and storage stability and because those compounds are easily available, and ethyl acetoacetate is especially preferable. Also when two or more chelate ligands are present, those chelate ligands may be the same or different.

As a method of adding the above described titanium chelates, in addition to a method of directly adding the above described titanium chelates, there can be used a method of adding a chelating agent such as ethyl acetoacetate and a titanium compound reactable with the chelating agent such as titanium tetraisopropoxide or titanium dichloride diisopropoxide to the composition of the present invention to subject the titanium compound to chelating in the composition in situ.

The titanium chelates of the component (B) may be used either each alone or in combinations of two or more thereof.

The used amount of the component (B) is preferably from 0.1 to 20 parts by weight, and more preferably from 0.5 to 15 parts by weight, especially preferably from 1 to 10 parts by weight with respect to 100 parts by weight of the component (A). When the blended amount of the component (B) is less than the above described ranges, sometimes the practical curing rate cannot be obtained, and the curing reaction hardly proceeds to a sufficient extent. On the other hand, when the blended amount of the component (B) exceeds the above described ranges, there is a tendency that the work life becomes too short and the workability is degraded.

In the present invention, a titanium catalyst other than the component (B) can be used to an extent not to degrade the effect of the present invention. Examples thereof include titanium alkoxides such as titanium tetramethoxide, titanium tetraethoxide, titanium allyloxide, titanium tetra-n-propoxide, titanium tetraisopropoxide, titanium tetra-n-butoxide, titanium tetraisobutoxide, titanium tetra-sec-butoxide, titanium tetra-t-butoxide, titanium tetra-n-pentyloxide, titanium tetracyclopentyloxide, titanium tetrahexyloxide, titanium tetracyclohexyloxide, titanium tetrabenzyloxide, titanium tetraoctyloxide, titanium tetrakis(2-ethylhexyloxide), titanium tetradecyloxide, titanium tetradodecyloxide, titanium tetrastearyloxide, titanium tetrabutoxide dimer, titanium tetrakis(8-hydroxyoctyloxide), titanium diisopropoxidebis(2-ethyl-1,3-hexanediolate), titanium bis(2-ethylhexyloxy)bis(2-ethyl-1,3-hexanediolate), titanium tetrakis(2-chloroethoxide), titanium tetrakis(2-bromoethoxide), titanium tetrakis(2-methoxyethoxide), titanium tetrakis (2-ethoxyethoxide), titanium butoxidetrimethoxide, titanium dibutoxidedimethoxide, titanium butoxidetriethoxide, titanium dibutoxidediethoxide, titanium butoxidetriisopropoxide, titanium dibutoxidediisopropoxide, titanium tetraphenoxide, titanium tetrakis(o-chlorophenoxide), titanium tetrakis(m-nitrophenoxide) and titanium tetrakis(p-methylphenoxide); titanium acylates such as titanium acrylate triisopropoxide, titanium methacrylate triisopropoxide, titanium dimethacrylate diisopropoxide, titanium trimethacrylate isopropoxide, titanium hexanoate triisopropoxide and titanium stearate triisopropoxide; halogenated titanates such as titanium chloride triisopropoxide, titanium dichloride diisopropoxide, titanium isopropoxide trichloride, titanium bromide triisopropoxide, titanium fluoride triisopropoxide, titanium chloride triethoxide and titanium chloride tributoxide; titanium chelates such as titanium dimethoxidebis(acetylacetonate), titanium diethoxidebis(acetylacetonate), titanium diisopropoxidebis(acetylacetonate), titanium diisopropoxidebis(2,2,6,6-tetramethyl-3,5-heptanedionate), titanium di-n-butoxidebis(acetylacetonate), titanium diisobutoxidebis(acetylacetonate), titanium di-t-butoxidebis (acetylacetonate), titanium di-2-ethylhexoxidebis(acetylacetonate), titanium triisopropoxide(diethylmalonate), titanium diisopropoxidebis(triethanolaminate) and titanium tetrakis(ethylacetoacetate); other titanates such as titanium tris(dioctylphosphate)isopropoxide, titanium tris(dodecylbenzenesulfonate)isopropoxide and dihydroxytitaniumbislactate; and the like.

In the present invention, a photostabilizer is used as the component (C), and the photostabilizer (C-1) having no benzotriazole ring is used as its main component. The photostabilizer is a compound which has a function of inhibiting formation of radicals by absorbing light having a wavelength of ultraviolet region, a function of collecting radicals formed by light absorption and converting them to heat energy to make them harmless, and the like function, and heightens stability to light and improves weather resistance of the composition of the present invention. While the photostabilizer (C-2) having a benzotriazole ring is generally used well in combination with an organotin catalyst, the present inventors have found that there is a problem that when the photostabilizer (C-2) is used in combination with the titanium chelate of the component (B) of the present invention, curability is degraded and further, the composition is remarkably colored. In order to obtain a composition undergoing less coloration and having satisfactory weather resistance and curability, it is essential that the main component of the photostabilizer (C) of the present invention is the photostabilizer (C-1) having no benzotriazole ring.

Specific examples of the photostabilizer (C-1) having no benzotriazole ring include benzoate ultraviolet absorbers represented by the general formula (11):

wherein $Ar^1$ and $Ar^2$ are each independently a substituted or unsubstituted aryl group, triazine ultraviolet absorbers represented by the general formula (12):

wherein $Ar^3$, $Ar^4$ and $Ar^5$ are each independently a substituted or unsubstituted aryl group, cyano acrylate ultraviolet absorbers represented by the general formula (13):

wherein $Ar^6$ and $Ar^7$ are each independently a substituted or unsubstituted aryl group, $R^{14}$ is hydrogen atom or a substituted or unsubstituted hydrocarbon group, benzophenone ultraviolet absorbers represented by the general formula (14):

wherein $Ar^8$ and $Ar^9$ are each independently a substituted or unsubstituted aryl group, and hindered amine photostabilizers which are compounds having a piperidine ring. Preferred examples of the above described hindered amine photostabilizers include compounds having a group represented by the general formula (15):

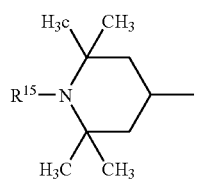

wherein $R^{15}$ is hydrogen atom or an organic group because an effect of improving weather resistance is high. Particularly preferable are hindered amines having no —NH— group, namely hindered amines in which $R^{15}$ in the general formula (15) is an organic group because in the case of combination use with the titanium chelate of the component (B) of the present invention, degrading of curability is small and the composition exhibits satisfactory curability as compared with hindered amines in which $R^{15}$ is hydrogen atom. Examples of the organic group include substituted or unsubstituted alkyl groups, alkoxy groups, acyl groups, acyloxy groups and the like, and substituted or unsubstituted alkyl groups are more preferable because those groups are easily available. Particularly preferable are unsubstituted alkyl groups, and most preferable is a methyl group.

Of the above described photostabilizers, benzoate ultraviolet absorbers, triazine ultraviolet absorbers, cyano acrylate ultraviolet absorbers and hindered amine photostabilizers are preferable because a composition undergoing less coloration can be obtained. Additionally, from the viewpoint of weather resistance of the obtained composition, benzoate ultraviolet absorbers, triazine ultraviolet absorbers, benzophenone ultraviolet absorbers and hindered amine photostabilizers are preferable, and more preferable are benzoate ultraviolet absorbers, triazine ultraviolet absorbers and hindered amine photostabilizers, particularly preferable are triazine ultraviolet absorbers and hindered amine photostabilizers, and most preferable are hindered amine photostabilizers.

Specific examples of the above described benzoate ultraviolet absorbers include 4-t-butylphenyl salicylate, 2,4-di-t-butylphenyl-3,5-di-t-butyl-4-hydroxy benzoate, phenyl salicylate and the like. Examples of commercially available benzoate ultraviolet absorbers include Sumisorb 400 (produced by Sumitomo Chemical Co., Ltd.), SEESORB 201 and SEESORB 202 (both are produced by SHIPRO KASEI KAISHA, LTD.) and the like.

Specific examples of the above described triazine ultraviolet absorbers include 2-(4,6-diphenyl-1,3,5-triazine-2-yl)-5-(hexyloxy)-phenol and the like. Examples of commercially available triazine ultraviolet absorbers include TINUVIN 1577FF (produced by Ciba-Geigy Japan Ltd.) and the like.

Specific examples of the above described cyano acrylate ultraviolet absorbers include ethyl-2-cyano-3,3-diphenyl-acrylate, 2-ethylhexyl-2-cyano-3,3-diphenyl-acrylate and the like. Examples of commercially available cyano acrylate ultraviolet absorbers include VIOSORB 910 and VIOSORB 930 (both are produced by Kyodo Yakuhin Kabushiki Kaisha) and the like.

Specific examples of the above described benzophenone ultraviolet absorbers include 2-hydroxybenzophenone, 2,4-dihydroxybenzophenone, 2-hydroxy-4-methoxybenzophenone, 2-hydroxy-4-n-octoxybenzophenone, 2-hydroxy-4-n-dodecyloxybenzophenone, 2-hydroxy-4-benzyloxybenzophenone, 2,2'dihydroxy-4-methoxybenzophenone, 2,2'dihydroxy-4,4'-dimethoxybenzophenone, 2,2',4,4'-tetrahydroxybenzophenone and the like. Examples of commercially available benzophenone ultraviolet absorbers include VIOSORB 100, VIOSORB 105, VIOSORB 110 and VIOSORB 130 (all are produced by Kyodo Yakuhin Kabushiki Kaisha), KEMISORB 13, KEMISORB 111 and KEMISORB 1011 (all are produced by CHEMIPRO KASEI KAISHA, LTD.) and the like.

Specific examples of the above described hindered amine photostabilizers include bis(2,2,6,6,-tetramethyl-4-piperidyl)sebacate, bis(1,2,2,6,6,-pentamethyl-4-piperidyl)sebacate, 1-{2-[3-(3,5-di-tert-butyl-4-hydroxyphenyl)propionyloxy]ethyl}-4-[3-(3,5-di-tert-butyl-4-hydroxyphenyl) propionyloxy]-2,2,6,6,-tetramethylpiperidine, 4-benzoyloxy-2,2,6,6,-tetramethylpiperidine, 8-acetyl-3-dodecyl-7,7,9,9-tetramethyl-1,3,8-triazaspiro[4.5]decane-2, 4-dion, a polymer of dimethyl succinate and 4-hydroxy-2,2, 6,6-tetramethyl-1-piperidine ethanol, bis(2,2,6,6,-tetramethyl-1-octyloxy-4-piperidyl)sebacate, bis(1,2,2,6,6,-pentamethyl-4-piperidyl){[3,5-bis(1,1-dimethylethyl)-4-hydroxyphenyl]methyl}butylmalonate, tetrakis(1,2,2,6,6,-pentamethyl-4-piperidyl)1,2,3,4-butane-tetracarboxylate, tetrakis(2,2,6,6,-tetramethyl-4-piperidyl)1,2,3,4-butane-tetracarboxylate, N,N',N'',N'''-tetrakis-{4,6-bis-[butyl-(1,2,2,6,6,-pentamethyl-4-piperidyl)amino]-triazine-2-yl}-4,7-diazadecane-1,10-diamine, poly{[6-(1,1,3,3-tetramethylbutyl)amino-1,3,5,-triazine-2,4,-diyl][(2,2,6,6,-tetramethyl-4-piperidyl)imono]hexamethylene[(2,2,6,6,-tetramethyl-4-piperidyl)imino]}, and the like. Of these photostabilizers, preferable are hindered amines having no —NH— groups such as bis(1,2,2,6,6,-pentamethyl-4-piperidyl)sebacate, 1-{2-[3-(3,5-di-tert-butyl-4-hydroxyphenyl)propionyloxy]ethyl}-4-[3-(3,5-di-tert-butyl-4-hydroxyphenyl)propionyloxy]-2,2,6,6,-tetramethylpiperidine, 8-acetyl-3-dodecyl-7,7,9,9-tetramethyl-1,3,8-triazaspiro[4,5]decane-2,4-dion, a polymer of dimethyl succinate and 4-hydroxy-2,2,6,6-tetramethyl-1-piperidine ethanol, bis(2,2,6,6,-tetramethyl-1-octyloxy-4-piperidyl)sebacate, bis(1,2,2,6,6,-pentamethyl-4-piperidyl){[3,5-bis(1,1-dimethylethyl)-4-hydroxyphenyl]methyl}butylmalonate, tetrakis(1,2,2,6,6,-pentamethyl-4-piperidyl)1,2,3,4-butane-tetracarboxylate and N,N',N'',N'''-tetrakis-{4,6-bis-[butyl-(1,2,2,6,6,-pentamethyl-4-piperidyl)amino]triazine-2-yl}-4,7-diazadecane-1,10-diamine, because in the case of combination use with the titanium chelate of the component (B), degrading of curability is small and the composition exhibits satisfactory curability. Examples of commercially available hindered amine photostabilizers include SANOL LS-770, LS-765, LS-292, LS-2626, LS-1114, LS-744 and LS-440 (all produced by Sankyo Co., Ltd.); TINUVIN 622LD, TINUVIN 123S, TINUVIN 144, CHIMASSORB119FL, CHIMASSORB2020FDL and CHIMASSORB944FDL (all produced by Ciba-Geigy Japan Ltd.); ADEKA STAB LA-52, LA-57, LA-62, LA-67, LA-63, LA-68, LA-82 and LA-87 (all produced by Adeka Argus Chemical Co., Ltd.); and the like. Of these photostabilizers, hindered amine photostabilizers having no —NH— groups such as TINUVIN 622LD, TINUVIN 144 and CHIMASSORB119FL; ADEKA STAB LA-52, LA-62, LA-63 and LA-82; and LS-765, LS-292, LS-2626 and LS-440 are preferable because in the case of combination use with the titanium chelate of the component (B), degrading of curability is small and the composition exhibits satisfactory curability.

The photostabilizers of the component (C-1) having no benzotriazole ring may be used either each alone or in combinations of two or more thereof.

The used amount of the component (C-1) is preferably from 0.1 to 10 parts by weight, and more preferably from 0.3 to 5 parts by weight, especially preferably from 0.5 to 2 parts by weight with respect to 100 parts by weight of the component (A). When the blended amount of the component (C-1) is less than the above described ranges, sometimes an effect of improving weather resistance cannot be obtained. On the other hand, when the blended amount of the component (C-1) exceeds the above described ranges, there is a tendency that the composition is colored and the curability is degraded.

It is most desirable that the photostabilizer (C-2) having a benzotriazole ring is not contained as the photostabilizer (C). However when the photostabilizer (C-2) having a benzotriazole ring is contained as the photostabilizer (C), the content of (C-2) is preferably less than 0.1 part by weight, and more preferably less than 0.03 part by weight, especially preferably less than 0.01 part by weight with respect to 100 parts by weight of the polymer (A). If the photostabilizer (C-2) having a benzotriazole ring is contained in an amount of not less than 0.1 part by weight, there is a tendency that coloration occurs or curability is degraded. Specific examples of the photostabilizer (C-2) having a benzotriazole ring include 2-(2H-benzotriazole-2-yl)-p-cresol, 2-(2H-benzotriazole-2-yl)-4,6-bis(1-methyl-1-phenylethyl)phenol, 2,4-di-tert-butyl-6-(2H-benzotriazole-2-yl)phenol, 2-(5-chloro-2H-benzotriazole-2-yl)-4-methyl-6-(tert-butyl)phenol, 2,4-di-tert-butyl-6-(5-chloro-2H-benzotriazole-2-yl)phenol, 2-(2H-benzotriazole-2-yl)-4,6-di-tert-pentylphenol, 2-(2H-benzotriazole-2-yl)-4-(1,1,3,3-tetramethylbutyl)phenol, a reaction product of 3-[3-(2H-benzotriazole-2-yl)-5-tert-butyl-4-hydroxyphenyl] propionate and polyethylene glycol 300, 2-(2H-benzotriazole-2-yl)-6-dodecyl-4-methylphenol, 2,2'-methylenebis[4-(1,1,3,3-tetramethylbutyl)-6-(2H-benzotriazole-2-yl)phenol] and the like. Examples of commercially available photostabilizer having a benzotriazole ring include TINUVIN P, TINUVIN 234, TINUVIN 320, TINUVIN 326, TINUVIN 327, TINUVIN 328, TINUVIN 329, TINUVIN 213 and TINUVIN 571 (all produced by Ciba-Geigy Japan Ltd.); ADEKA STAB LA-31 (produced by ADEKA CORPORATION) and the like.

A filler can be added to the composition of the present invention. Examples of the fillers include reinforcing fillers such as fumed silica, precipitated silica, crystalline silica, fused silica, dolomite, anhydrous silicic acid, hydrous silicic acid and carbon black; fillers such as ground calcium carbonate, precipitated calcium carbonate, magnesium carbonate, diatomite, sintered clay, clay, talc, titanium oxide, bentonite, organic bentonite, ferric oxide, aluminum fine powder, flint powder, zinc oxide, active zinc white, shirasu balloon, glass microballoon, organic microballoons of phenolic resin and vinylidene chloride resin, and resin powders such as PVC powder and PMMA powder; and fibrous fillers such as asbestos, glass fiber and glass filament. When a filler is used, the used amount thereof is 1 to 250 parts by weight, and preferably 10 to 200 parts by weight with respect to 100 parts by weight of the polymer of the component (A).

As described in Japanese Patent Laid-Open No. 2001-181532, it is possible to homogeneously mix the above described filler with a dehydrating agent such as oxidized calcium, put the mixture in a bag made of an air-tight material to be sealed and then allow to stand for a proper period of time to dehydrate and dry previously. The use of this low molecular weight filler makes it possible to improve storage stability in the case of one-component type composition.

Additionally, when preparing a highly transparent composition, as described in Japanese Patent Laid-Open No. 11-302527, it is possible to use, as a filler, a polymer powder prepared by using a polymer such as methyl methacrylate as a starting material or a non-crystalline silica. Also as described in Japanese Patent Laid-Open No. 2000-38560, a highly transparent composition can be obtained by using, as a filler, a hydrophobic silica which is a fine powder of silicon dioxide having hydrophobic groups bonded to the surface thereof. The surface of a fine powder of silicon dioxide has generally silanol groups (—SiOH), but can be formed into a hydrophobic silica by reacting those silanol groups with halides of organosilicon or alcohols to produce —SiO— hydrophobic group. Specifically, the hydrophobic silica is obtained by reacting silanol groups being present in the surface of the fine powder of silicon dioxide with dimethylsiloxane, hexamethyldisilazane, dimethyldichlorosilane, trimethoxyoctylsilane, trimethylsilane or the like. A fine powder of silicon dioxide in which the surface thereof is formed by silanol groups (—SiOH) is called a hydrophilic fine powder of silica.

When it is desired to obtain a cured article high in strength by use of these fillers, preferable is a filler mainly selected from fumed silica, precipitated silica, crystalline silica, fused silica, dolomite, anhydrous silicic acid, hydrous silicic acid, carbon black, surface treated fine calcium carbonate, sintered clay, clay and active zinc white; a desirable effect is obtained when such a filler is used within a range from 1 to 200 parts by weight with respect to 100 parts by weight of the reactive silicone group-containing organic polymer (A). Additionally, when it is desired to obtain a cured article low in tensile strength and large in elongation at break, a desirable effect is obtained by use of a filler mainly selected from titanium oxide, calcium carbonate such as ground calcium carbonate and magnesium carbonate, talc, ferric oxide, zinc oxide and shirasu balloon within a range from 5 to 200 parts by weight with respect to 100 parts by weight of the reactive silicone group-containing organic polymer (A). It is to be noted that in general, the calcium carbonate exhibits, with increasing specific surface area value thereof, an increasing improvement effect of the tensile strength at break, elongation at break and adhesion of the cured article. Needless to say, these fillers may be used either each alone or in admixtures of two or more thereof. When calcium carbonate is used, it is desirable to use surface treated fine calcium carbonate in combination with calcium carbonate larger in particle size such as ground calcium carbonate. The particle size of surface treated fine calcium carbonate is preferably not more than 0.5 μm, and the surface treatment is preferably carried out by treating with a fatty acid or a fatty acid salt. The calcium carbonate larger in particle size is preferably not less than 1 μm in particle size, and can be used without being subjected to surface treatment.

For the purpose of improving the workability (cutting property, etc) of the composition and deglossing the surface of the cured article, organic balloons and inorganic balloons are preferably added. Such fillers can be subjected to surface treatment, and may be used each alone or can be used in admixtures of two or more thereof. For the purpose of improving the workability (cutting property, etc), the particle sizes of these balloons are preferably not more than 0.1 mm. For the purpose of deglossing the surface of the cured article, the particle sizes are preferably 5 to 300 μm.

On the grounds that the cured article of the composition of the present invention is satisfactory in chemical resistance and the like, the composition of present invention is suitably used for joints of housing exterior wall such as sizing boards, in particular, ceramic sizing boards, for an adhesive for exterior wall tiles, for an adhesive for exterior wall tiles remaining in the joints and for the like purposes; in this connection, it is desirable that the design of the exterior wall and the design of the sealant are in harmony with each other. Particularly, posh exterior walls have come to be used by virtue of sputter coating and mixing colored aggregates. When the composition of the present invention is blended with a scale-like or granulated material having a diameter of not less than 0.1 mm, preferably of the order of 0.1 to 5.0 mm, the cured article comes to be in harmony with such posh exterior walls, and is excellent in chemical resistance, so that the composition concerned comes to be an excellent composition in the sense that the exterior appearance of the cured article remains unchanged over a long period of time. Use of a granulated material provides a dispersed sand-like or sandstone-like surface with a rough texture, while use of a scale-like material provides an irregular surface based on the scale-like shape of the material.

The preferable diameter, blended amount and materials for the scale-like or granulated material are described in Japanese Patent Laid-Open No. 9-53063 as follows.

The diameter is not less than 0.1 mm, preferably of the order of 0.1 to 5.0 mm, and there is used a material having an appropriate size in conformity with the material quality and pattern of exterior wall. Materials having a diameter of the order of 0.2 mm to 5.0 mm and materials having a diameter of the order of 0.5 mm to 5.0 mm can also be used. In the case of a scale-like material, the thickness is set to be as thin as the order of 1/10 to 1/5 the diameter (the order of 0.01 to 1.00 mm). The scale-like or granulated material is transported to the construction site as a sealant on condition that the material is beforehand mixed in the main component of the sealant, or is mixed in the main component of the sealant at the construction site when the sealant is used.

The scale-like or granulated material is blended in a content of the order of 1 to 200 parts by weight with respect to 100 parts by weight of a composition such as a sealant composition and an adhesive composition. The blended amount is appropriately selected depending on the size of the scale-like or granulated material, and the material quality and pattern of exterior wall.

As the scale-like or granulated material, natural products such as silica sand and mica, synthetic rubbers, synthetic resins and inorganic substances such as alumina are used. The material is colored in an appropriate color so as to match the material quality and pattern of exterior wall to heighten the design quality when filled in the joints.

A preferable finishing method and the like are described in Japanese Patent Laid-Open No. 9-53063.

Additionally, when a balloon (preferably the mean particle size thereof is not less than 0.1 mm) is used for a similar purpose, the surface is formed to have a dispersed sand-like or sandstone-like surface with a rough texture, and a reduction of weight can be achieved. The preferable diameter, blended amount and materials for the balloon are described in Japanese Patent Laid-Open No. 10-251618 as follows.

The balloon is a sphere-shaped material with a hollow interior. Examples of the material for such a balloon include inorganic materials such as glass, shirasu and silica; and organic materials such as phenolic resin, urea resin, polystyrene and Saran™; however, the material concerned is not limited to these examples; an inorganic material and an organic material can be compounded, or can be laminated to form multiple layers. An inorganic balloon, an organic balloon, a balloon made of a compounded inorganic-organic material or the like can be used. Additionally, as a balloon to be used, either a type of balloon or an admixture of multiple types of balloons can be used. Moreover, a balloon with the processed surface thereof or with the coated surface thereof can be used, and additionally, a balloon with the surface thereof subjected to treatment with various surface treatment agents can also be used. More specifically, examples are an organic balloon coated with calcium carbonate, talc, titanium oxide and the like, and an inorganic balloon subjected to surface treatment with a silane coupling agent.

For the purpose of obtaining a dispersed sand-like or sandstone-like surface with a rough texture, the particle size of the balloon is preferably not less than 0.1 mm. A balloon of a particle size of the order of 0.2 mm to 5.0 mm or a balloon of a particle size of the order of 0.5 mm to 5.0 mm can also be used. Use of a balloon of a particle size of less than 0.1 mm sometimes only increases the viscosity of the composition, and yields no rough texture, even when the used amount of the balloon is large. The blended amount of the balloon can be easily determined in conformity with the desired degree of the dispersed sand-like or sandstone-like rough texture. Usually, it is desirable that a balloon of not less than 0.1 mm in particle size is blended in a ratio of 5 to 25 vol % in terms of the volume concentration in the composition. When the volume concentration of the balloon is less than 5 vol %, no rough texture can be obtained, while when the volume concentration of the balloon exceeds 25 vol %, the viscosity of the sealant and that of the adhesive tend to become high to degrade the workability, and the modulus of the cured article becomes high, so that the basic performance of the sealant and that of the adhesive tend to be impaired. The preferable volume concentration to balance with the basic performance of the sealant is 8 to 22 vol %.

When a balloon is used, there can be added an antislip agent described in Japanese Patent Laid-Open No. 2000-154368 and an amine compound to make irregular and degloss the surface of the cured article as described in Japanese Patent Laid-Open No. 2001-164237, in particular, a primary amine and/or a secondary amine having a melting point of not less than 35° C.

Specific examples of the balloon are described in the following publications: Japanese Patent Laid-Open Nos. 2-129262, 4-8788, 4-173867, 5-1225, 7-113073, 9-53063, 10-251618, 2000-154368 and 2001-164237, and WO97/05201 pamphlet.

Additionally, thermally expandable fine hollow particles disclosed in Japanese Patent Laid-Open No. 2004-51701 or 2004-66749 can be used. The thermally expandable fine hollow particles are plastic spherical particulates produced by surrounding a low boiling point compound such as a hydrocarbon having 1 to 5 carbon atoms with a high molecular weight shell material (vinylidene chloride copolymer, acrylonitrile copolymer or vinylidene chloride-acrylonitrile copolymer). When the adhered portion obtained by using the composition of the present invention is heated, gas pressure inside the shell of the thermally expandable fine hollow particles is increased and the high molecular weight shell material is softened to markedly expand its volume and functions to cause peeling at the adhesion interface. By the addition of the thermally expandable fine hollow particles, it is possible to obtain an adhesive composition which can be peeled easily only by heating without breakage of material when adhesion becomes unnecessary and also can be peeled by heating without using an organic solvent.

When the composition of the present invention includes the particles of the cured article derived from a sealant, the cured article can make irregularities on the surface to improve the design quality. The preferable diameter, blended amount and materials of the cured article particle material derived from a sealant is described in Japanese Patent Laid-Open No. 2001-115142 as follows. The diameter is preferably of the order of 0.1 mm to 1 mm, and further preferably of the order of 0.2 to 0.5 mm. The blended amount is preferably 5 to 100 wt %, and further preferably 20 to 50 wt % in the curable composition. Examples of the materials include urethane resin, silicone, modified silicone and polysulfide rubber. No constraint is imposed on the materials as long as the materials can be used as sealants; however, modified silicone sealants are preferable.

To the composition of the present invention can be added an adhesion-imparting agent. No particular constraint is imposed on the adhesion-imparting resins, and usual adhesion-imparting resins can be used irrespective of solid form or liquid form at ordinary temperature. Specific examples of such adhesion-imparting resins include styrene block copolymers, hydrogenated products thereof, phenolic resins, modified phenolic resins (for example, cashew oil-modified phenolic resins, tall oil-modified phenolic resins and the like), terpene phenolic resins, xylene-phenol resins, cyclopentadiene-phenol resins, cumarone-indene resins, rosin resins, rosin ester resins, hydrogenated rosin ester resins, xylene resins, low molecular weight polystyrene resins, styrene copolymer resins, petroleum resins (for example, C5 hydrocarbon resin, C9 hydrocarbon resin, C5C9 hydrocarbon copolymer resin and the like), hydrogenated petroleum resins, terpene resins, DCPD resin-petroleum resin and the like. Those resins may be used either each alone or in combinations of two or more thereof. Examples of the styrene block copolymers and hydrogenated products thereof include styrene-butadiene-styrene block copolymer (SBS), styrene-isoprene-styrene block copolymer (SIS), styrene-ethylenebutylene-styrene block copolymer (SEBS), styrene-ethylenepropylene-styrene block copolymer (SEPS), styrene-isobutylene-styrene block copolymer (SIBS) and the like. The above described adhesion-imparting resins may be used either each alone or in combinations of two or more thereof.

The adhesion-imparting resins are used within a range from 5 to 1,000 parts by weight, preferably from 10 to 100 parts by weight with respect to 100 parts by weight of the organic polymer (A).

A plasticizer can be added to the composition of the present invention. Addition of a plasticizer makes it possible to adjust the viscosity and slump property of the curable composition and the mechanical properties such as tensile strength and elongation of the cured article obtained by curing the composition. Examples of the plasticizer include phthalates such as dibutyl phthalate, diheptyl phthalate, di(2-ethylhexyl)phthalate and butyl benzyl phthalate; non-aromatic dibasic acid esters such as dioctyl adipate, dioctyl sebacate, dibutyl sebacate and diisodecyl succinate; aliphatic esters such as butyl oleate and methyl acetyl recinolate; phosphates such as tricresyl phosphate and tributyl phosphate; trimellitates; chlorinated paraffins; hydrocarbon oils such as alkyldiphenyls and partially hydrogenated terphenyls; process oils; epoxy plasticizers such as epoxidized soybean oil and benzyl epoxystearate.

Additionally, a polymer plasticizer can be used. When a polymer plasticizer is used, the initial physical properties are maintained over a longer period of time than when a low molecular weight plasticizer is used which is a plasticizer containing no polymer component in the molecule. Moreover, the drying property (also referred to as coating property) can be improved when an alkyd coating material is applied onto the cured article concerned. Examples of the polymer plasticizer include vinyl polymers obtained by polymerizing vinyl monomers by means of various methods; polyalkylene glycol esters such as diethylene glycol dibenzoate, triethylene glycol dibenzoate and pentaerythritol ester; polyester plasticizers obtained from dibasic acids such as sebacic acid, adipic acid, azelaic acid and phthalic acid and dihydric alcohols such as ethylene glycol, diethylene glycol, triethylene glycol, propylene glycol and dipropylene glycol; polyethers including polyether polyols each having a molecular weight of not less than 500, additionally not less than 1,000 such as polyethylene glycol, polypropylene glycol and polytetramethylene glycol, and the derivatives of these polyether polyols in which the hydroxy groups in these polyether polyols are substituted with ester groups, ether groups and the like; polystyrenes such as polystyrene and poly-α-methylstyrene; and polybutadiene, polybutene, polyisobutylene, butadiene-acrylonitrile and polychloroprene. However, the polymer plasticizer concerned is not limited to these examples.

Of these polymer plasticizers, the polymer plasticizers which are compatible with the polymer of component (A) are preferable. In this regard, polyethers and vinyl polymers are preferable. Additionally, the use of polyethers as plasticizers improves the surface curability and deep-part curability, and causes no curing retardation after storage, and hence polyethers are preferable; of polyethers, polypropylene glycol is more preferable. Additionally, from the viewpoint of the compatibility, weather resistance and heat resistance, vinyl polymers are preferable. Of the vinyl polymers, acryl polymers and/or methacryl polymers are preferable, and acryl polymers such as polyalkylacrylate are further preferable. As the polymerization method to produce acryl polymers, the living radical polymerization method is preferable because this method can lead to narrow molecular weight distributions and low viscosities, and the atom transfer radical polymerization method is further preferable. Additionally, it is preferable to use a polymer based on the so-called SGO process which is obtained by continuously block-polymerizing an alkyl acrylate monomer at a high temperature under a high pressure, as described in Japanese Patent Laid-Open No. 2001-207157.

The number average molecular weight of the polymer plasticizer is preferably 500 to 15,000, more preferably 800 to 10,000, further preferably 1,000 to 8,000, particularly preferably 1,000 to 5,000, and most preferably 1,000 to 3,000. When the molecular weight is too low, the plasticizer is removed with time due to heat and by rainfall, and hence it is made impossible to maintain the initial physical properties over a long period of time, and the coating property with an alkyd coating material cannot be improved. On the other hand, when the molecular weight is too high, the viscosity becomes high and the workability is degraded. No particular constraint is imposed on the molecular weight distribution of the polymer plasticizer. However, it is preferable that the molecular weight distribution is narrow; the molecular weight distribution is preferably less than 1.80, more preferably not more than 1.70, further preferably not more than 1.60, yet further preferably not more than 1.50, particularly preferably not more than 1.40 and most preferably not more than 1.30.

The number average molecular weight of a vinyl polymer is measured with the GPC method, and that of a polyether polymer is measured with the terminal group analysis method. Additionally, the molecular weight distribution (Mw/Mn) is measured with the GPC method (relative to polystyrene standard).

Additionally, the polymer plasticizer either may have no reactive silicon group or may have a reactive silicon group. When the polymer plasticizer has a reactive silicon group, the polymer plasticizer acts as a reactive plasticizer, and can prevent the migration of the plasticizer from the cured article. When the polymer plasticizer has a reactive silicon group, the average number of reactive silicon groups per molecule is not more than 1, and preferably not more than 0.8. When the reactive silicon group-containing plasticizer, in particular, a reactive silicon group-containing oxyalkylene polymer is used, it is necessary that the number average molecular weight thereof is lower than that of the polymer of the component (A).

The plasticizers may be used either each alone or in combinations of two or more thereof. Additionally, a low molecular weight plasticizer and a polymer plasticizer may be used in combination. It is to be noted that these plasticizers can also be blended when the polymer is produced.

The used amount of the plasticizer is 5 to 150 parts by weight, preferably 10 to 120 parts by weight, and further preferably 20 to 100 parts by weight, with respect to 100 parts by weight of the polymer of the component (A). When the used amount is less than 5 parts by weight, the effect as the plasticizer is not exhibited, while when the used amount exceeds 150 parts by weight, the mechanical strength of the cured article is insufficient.

To the curable composition of the present invention may be added, as case demands, a compound to hydrolytically produce a compound having a monovalent silanol group in the molecule thereof. This compound has an effect of decreasing the modulus of the cured article without degrading the stickiness of the surface of the cured article. Particularly, a compound to produce trimethylsilanol is preferable. Examples of the compound to hydrolytically produce a compound having a monovalent silanol group in the molecule thereof include a compound described in Japanese Patent Laid-Open No. 5-117521. Additionally, examples of such a compound include a compound which is a derivative of an alkyl alcohol such as hexanol, octanol or decanol, and produces a silicon compound to hydrolytically produce $R_3SiOH$ such as trimethylsilanol, and a compound described in Japanese Patent Laid-Open No. 11-241029 which is a derivative of a polyhydric alcohol having three or more hydroxy groups such as trimethylolpropane, glycerin, pentaerythritol or sorbitol, and produces a silicon compound to hydrolytically produce $R_3SiOH$ such as trimethylsilanol.

Additionally, there can be cited such a compound as described in Japanese Patent Laid-Open No. 7-258534 which is a derivative of oxypropylene polymer and produces a silicon compound to hydrolytically produce $R_3SiOH$ such as trimethylsilanol. Moreover, there can be used a polymer described in Japanese Patent Laid-Open No. 6-279693 which contains a hydrolyzable silicon-containing group capable of cross-linking and a silicon-containing group capable of hydrolytically forming a monosilanol-containing compound.

The compound to hydrolytically produce a compound having a monovalent silanol group in the molecule thereof is used within a range from 0.1 to 20 parts by weight, and preferably from 0.5 to 10 parts by weight, with respect to 100 parts by weight of the reactive silicon group-containing organic polymer (A).

To the curable composition of the present invention, according to need, a thixotropy providing agent (antisagging agent) may be added for the purpose of preventing sagging and improving workability. No particular constraint is imposed on the antisagging agent; however, examples of the antisagging agent include polyamide waxes; hydrogenated castor oil derivatives; and metal soaps such as calcium stearate, aluminum stearate and barium stearate. Additionally, when a rubber powder having a particle size of 10 to 500 µm as described in Japanese Patent Laid-Open No. 11-349916, and an organic fiber as described in Japanese Patent Laid-Open No. 2003-155389 are used, a composition having high thixotropy and satisfactory workability can be obtained. These thixotropy providing agents (antisagging agents) may be used either each alone or in combinations of two or more thereof. The thixotropy providing agents each are used within a range from 0.1 to 20 parts by weight with respect to 100 parts by weight of the reactive silicon group-containing organic polymer (A).

In the composition of the present invention, a compound containing an epoxy group in one molecule can be used. Use of an epoxy group-containing compound can increase the recovery properties of the cured article. Examples of the epoxy group-containing compound include compounds such as epoxidized unsaturated oils and fats, epoxidized unsaturated fatty acid esters, alicyclic epoxy compounds and epichlorohydrin derivatives, and admixtures of these compounds. More specific examples include epoxidized soybean oil, epoxidized flaxseed oil, bis(2-ethylhexyl)-4,5-epoxycyclohexane-1,2-dicarboxylate(E-PS), epoxyoctyl stearate and epoxybutyl stearate. Of these, E-PS is particularly preferable. It is recommended that these epoxy group-containing compounds each are used within a range from 0.5 to 50 parts by weight with respect to 100 parts by weight of the reactive silicon group-containing organic polymer (A).

For the composition of the present invention, a photocuring substance can be used. Use of a photocuring substance forms a coating film of the photocuring substance on the surface of the cured article to improve the stickiness and the weather resistance of the cured article. A photocuring substance means a substance which undergoes a chemical change, caused by action of light, of the molecular structure thereof in a fairly short time to result in changes of the physical properties such as curability. Among such a large number of compounds known are organic monomers, oligomers, resins and compositions containing these substances, and any commercially available substances concerned can optionally be adopted. As representative photocuring substances, unsaturated acryl compounds, polyvinyl cinnamates, azidized resins and the like can be used. The unsaturated acryl compounds are monomers, oligomers and admixtures of the monomers and the oligomers, the monomers and oligomers each having one or a few acryl or methacryl unsaturated groups; examples of the unsaturated acryl compounds include monomers such as propylene (or butylene, or ethylene)glycol di(meth)acrylate and neopentylglycol di(meth)acrylate, and oligoesters of not more than 10,000 in molecular weight related to these monomers. Specific examples include special acrylates (bifunctional) such as ARONIX M-210, ARONIX M-215, ARONIX M-220, ARONIX M-233, ARONIX M-240 and ARONIX M-245; special acrylates (trifunctional) such as ARONIX M-305, ARONIX M-309, ARONIX M-310, ARONIX M-315, ARONIX M-320 and ARONIX M-325; and special acrylates (multifunctional) such as ARONIX M-400. Those compounds which each have acrylic functional groups are particularly preferable, and additionally, those compounds which each have, on average, three or more acrylic functional groups in one molecule are preferable (all the aforementioned ARONIXs are the products of Toagosei Co., Ltd.).

Examples of the polyvinyl cinnamates include photosensitive resins having cinnamoyl groups as photosensitive groups, namely, those compounds obtained by esterification of polyvinyl alcohol with cinnamic acid; and additionally, a large number of derivatives of polyvinyl cinnamates. Azidized resins are known as photosensitive resins having azide groups as photosensitive groups; common examples of the azidized resins include a rubber photosensitive solution added with an azide compound as a photosensitive agent, and additionally, the compounds detailed in "photosensitive resins" (published by Insatu Gakkai Shuppanbu, Mar. 17, 1972, p. 93, p. 106 and p. 117); and these compounds can be used each alone or in admixtures thereof, and in combination with sensitizers to be added according to need. It is to be noted that addition of sensitizers such as ketones and nitro compounds and accelerators such as amines sometimes enhances the effect. It is recommended that the photocuring substance is used within a range from 0.1 to 20 parts by weight and preferably from 0.5 to 10 parts by weight with respect to 100 parts by weight of the reactive silicon group-containing organic polymer (A); when the content of the photocuring substance is less than 0.1 part by weight, no effect to increase the weather resistance is displayed, while when the content exceeds 20 parts by weight, the cured article tends to be too hard and cracked.

For the composition of the present invention, an oxygen-curable substance can be used. Examples of the oxygen-curable substance include unsaturated compounds reactable with the oxygen in the air, which react with the oxygen in the air and form a cured coating film around the surface of the cured article to act to prevent the surface stickiness and the sticking of dust and grime to the surface of the cured article and to do the like. Specific examples of the oxygen-curable substance include drying oils represented by wood oil, flaxseed oil and the like and various alkyd resins obtained by modifying these compounds; acryl polymers, epoxy resins and silicon resins all modified with drying oils; liquid polymers such as 1,2-polybutadiene and 1,4-polybutadiene obtained by polymerizing or copolymerizing diene compounds such as butadiene, chloroprene, isoprene and 1,3-pentadiene, and polymers derived from C5 to C8 dienes, liquid copolymers such as NBR, SBR and the like obtained by copolymerizing these diene compounds with monomers such as acrylonitrile, styrene and the like having copolymerizability so as for the diene compounds to dominate, and various modified substances of these compounds (maleinized modified substances, boiled oil-modified substances, and the like). These substances can be used either each alone or in combinations of two or more thereof. Of these substances, wood oil and liquid diene polymers are particularly preferable. Additionally, in some cases, when catalysts to accelerate the oxidation curing reaction and metal dryers are used in combination with these substances, the effect is enhanced. Examples of these catalysts and metal dryers include metal salts such as cobalt naphthenate, lead naphthenate, zirconium naphthenate, cobalt octylate and zirconium octylate; and amine compounds. It is recommended that the oxygen-curing substance is used within a range from 0.1 to 20 parts by weight and further preferably from 0.5 to 10 parts by weight with respect to 100 parts by weight of the reactive silicon group-containing organic polymer (A); when the used amount is less than 0.1 part by weight, improvement of stain-proof property becomes insufficient, while when the used amount exceeds 20 parts by weight, the tensile property and the like of the cured article tends to be impaired. It is recommended that the oxygen-curing substance is used in combination with a photocuring substance as described in Japanese Patent Laid-Open No. 3-160053.

For the composition of the present invention, an antioxidant (antiaging agent) can be used. Use of an antioxidant can increase the heat resistance of the cured article. Examples of the antioxidant can include hindered phenol antioxidants, monophenol antioxidants, bisphenol antioxidants and polyphenol antioxidants, and hindered phenol antioxidants are particularly preferable. Specific examples of the antioxidants are described also in Japanese Patent Laid-Open Nos. 4-283259 and 9-194731. It is recommended that the antioxidant is used within a range from 0.1 to 10 parts by weight and further preferably from 0.2 to 5 parts by weight with respect to 100 parts by weight of the reactive silicon group-containing organic polymer (A).

To the composition of the present invention, an epoxy resin can be added. The composition added with an epoxy resin is particularly preferable as an adhesive, in particular, an adhesive for exterior wall tile. Examples of the epoxy resin include epichlorohydrin-bisphenol A-type epoxy resins, epichlorohydrin-bisphenol F-type epoxy resins, flame resistant epoxy resins such as glycidyl ether of tetrabromobisphenol A, novolac-type epoxy resins, hydrogenated bisphenol A-type epoxy resins, epoxy resins of the type of glycidyl ether of bisphenol A propyleneoxide adduct, p-oxybenzoic acid glycidyl ether ester-type epoxy resins, m-aminophenol epoxy resins, diaminodiphenylmethane epoxy resins, urethane modified epoxy resins, various alicyclic epoxy resins, N,N-diglycidylaniline, N,N-diglycidyl-o-toluidine, triglycidyl isocyanurate, polyalkylene glycol diglycidyl ether, glycidyl ethers of polyhydric alcohols such as glycerin, hydantoin-type epoxy resins and epoxidized substances of unsaturated polymers such as petroleum resins; however the epoxy resin is not limited to these examples, and commonly used epoxy resins can be used. Epoxy resins having at least two epoxy groups in one molecule are preferable because such compositions are high in reactivity when curing is made, and the cured articles can easily form three dimensional networks. Examples of further preferable epoxy resins include bisphenol A-type epoxy resins or novolac-type epoxy resins. The ratio of the used amount of each of these epoxy resins to the used amount of the reactive silicon group-containing organic polymer (A) falls, in terms of weight ratio, in the range such that organic polymer (A)/epoxy resin=100/1 to 1/100. When the ratio of organic polymer (A)/epoxy resin is less than 1/100, the effect of improving the impact strength and the toughness of the cured article of the epoxy resin becomes hardly obtainable, while when the ratio of organic polymer (A)/epoxy resin exceeds 100/1, the strength of the cured article of the organic based polymer becomes insufficient. The preferable ratio of the used amounts varies depending on the application of the curable resin composition and hence cannot be unconditionally determined; for example, when the impact resistance, flexibility, toughness, peel strength and the like of the cured article of the epoxy resin are to be improved, it is recommended that with respect to 100 parts by weight of the epoxy resin, 1 to 100 parts by weight of the component (A), further preferably 5 to 100 parts by weight of the component (A) is used. On the other hand, when the strength of the cured article of the component (A) is to be improved, it is recommended that with respect to 100 parts of the component (A), 1 to 200 parts by weight of the epoxy resin, further preferably 5 to 100 parts by weight of the epoxy resin is used.

When the epoxy resin is added, as a matter of course, a curing agent to cure the epoxy resin can be applied together to the composition of the present invention. No particular constraint is imposed on the usable epoxy resin-curing agent, and commonly used epoxy resin-curing agents can be used. Specific examples of the epoxy resin-curing agent include primary and secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, and polyether with amine terminal groups; tertiary amines such as 2,4,6-tris(dimethylaminomethyl)phenol and tripropylamine, and salts of those tertiary amines; polyamide resins; imidazoles; dicyandiamides; borontrifluoride complexes; carboxylic anhydrides such as phthalic anhydride, hexahydrophthalic anhydride, tetrahydrophthalic anhydride, dodecynylsuccinic anhydride, pyromellitic anhydride and chlorendic anhydride; alcohols; phenols; carboxylic acids; and diketone complexes of aluminum and zirconium. However, the epoxy resin-curing agent is not limited to these examples. Additionally, the curing agents may be used either each alone or in combinations of two or more thereof.

When an epoxy resin-curing agent is used, the used amount thereof falls within a range from 0.1 to 300 parts by weight with respect to 100 parts by weight of the epoxy resin.

As an epoxy resin-curing agent, a ketimine can be used. A ketimine is stable when no moisture is present, but moisture decomposes the ketimine into a primary amine and a ketone; the thus produced primary amine acts as a room temperature curable curing agent to cure the epoxy resin. Use of a ketimine makes it possible to obtain a one-component type composition. Such a ketimine can be obtained by condensation reaction of an amine compound and a carbonyl compound.

For the synthesis of a ketimine, an amine compound and a carbonyl compound well known in the art can be used. For example, the following compounds can be used as such an amine compound: diamines such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine and p,p'-biphenylenediamine; polyvalent amines such as 1,2,3-triaminopropane, triaminobenzene, tris (2-amionoethyl)amine and tetrakis(aminomethyl)methane; polyalkylenepolyamines such as diethylenetriamine, triethylenetriamine and tetraethylenepentamine; polyoxyalkylene polyamines; and aminosilanes such as γ-aminopropyltriethoxysilane, N-(β-aminoethyl)-γ-aminopropyltrimethoxysilane and N-(β-aminoethyl)-γ-aminopropylmethyldimethoxysilane. Additionally, the following compounds can be used as such a carbonyl compound: aldehydes such as acetaldehyde, propionaldehyde, n-butylaldehyde, isobutylaldehyde, diethylacetaldehyde, glyoxal and benzaldehyde; cyclic ketones such as cyclopentanone, trimethylcyclopentanone, cyclohexanone and trimethylcyclohexanone; aliphatic ketones such as acetone, methyl ethyl ketone, methyl propyl ketone, methyl isopropyl ketone, methyl isobutyl ketone, diethyl ketone, dipropyl ketone, diisopropyl ketone, dibutyl ketone and diisobutyl ketone; and β-dicarbonyl compounds such as acetylacetone, methyl acetoacetate, ethyl acetoacetate, dimethyl malonate, diethyl malonate, methyl ethyl malonate and dibenzoylmethane.

When an imino group is present in the ketimine, the imino group can be reacted with styrene oxide; glycidyl ethers such as butyl glycidyl ether and allyl glycidyl ether; and glycidyl esters. These ketimines may be used either each alone or in combinations of two or more thereof; these ketimines each are used within a range from 1 to 100 parts by weight with respect to 100 parts by weight of the epoxy resin, the used amount of each of the ketimines varies depending on the type of the epoxy resin and the type of the ketimine.

To the curable composition of the present invention can be added a phosphorous-based plasticizer such as polyphosphoric acid ammonium or tricresyl phosphate and a flame retardant such as aluminum hydroxide, magnesium hydroxide or thermally expandable graphite. These flame retardants may be used either each alone or in combinations of two or more thereof.

The flame retardant is used within a range from 5 to 200 parts by weight, and preferably from 10 to 100 parts by weight with respect to 100 parts by weight of the component (A).

To the composition of the present invention can be added a solvent for the purposes of decreasing a viscosity, enhancing thixotropy and improving workability. No particular constraint is imposed on the solvent, and various compounds can be used. Specific examples thereof include hydrocarbon solvents such as toluene, xylene, heptane, hexane and petroleum solvents; halogen solvents such as trichloroethylene; ester solvents such as ethyl acetate and butyl acetate; ketone solvents such as acetone, methyl ethyl ketone and methyl isobutyl ketone; ether solvents; alcohol solvents such as methanol, ethanol and isopropanol; and silicone solvents such as hexamethylcyclotrisiloxane, octamethylcyclotetrasiloxane and decamethylcyclopentasiloxane. When a solvent is used, the boiling point of the solvent is preferably not less than 150° C., more preferably not less than 200° C., particularly preferably not less than 250° C. from the viewpoint of a problem with contamination to the air when the composition is used indoor. These solvents may be used either each alone or in combinations of two or more thereof.

It is to be noted that when the blended amount of the solvents is abundant, in some cases, toxicity to human body becomes high, and a volume shrinkage of the cured article occurs. Accordingly, the blended amount of the solvents is preferably not more than 3 parts by weight, more preferably not more than 1 part by weight with respect to 100 parts by weight of the organic polymer of the component (A), and it is most preferable that no solvents are contained substantially in the composition.

To the curable composition of the present invention, various additives can be added according to need for the purpose of regulating the physical properties of the curable composition or the cured article. Examples of such additives include curing regulators, radical inhibitors, metal deactivators, antiozonants, phosphorus-based peroxide decomposers, lubricants, pigments, foaming agents, ant-proofing agents and mildew proofing agents. These various additives may be used either each alone or in combinations of two or more thereof. Specific examples of additives other than the specific examples cited in the present specification are described, for example, in Japanese Patent Examined Publication Nos. 4-69659 and 7-108928, Japanese Patent Laid-Open Nos. 63-254149, 64-22904, 2001-72854 and the like.

The curable composition of the present invention can also be prepared as a one-component type composition curable after application with moisture in the air in such a way that all the blended components are beforehand blended together and hermetically stored. The curable composition of the present invention can also be prepared as two-component type composition in such a way that a compound agent is prepared as a curing agent by blending together a curing catalyst, a filler, a plasticizer and water, and the thus blended material is mixed with a polymer composition before use. From the viewpoint of workability, a one-component type composition is preferable.

When the above described curable composition is of the one-component type, all the blended components are blended together beforehand, so that it is preferable that the blended components containing moisture are used after dehydrating and drying, or the components are dehydrated by reducing pressure or the like while being kneaded for blending. When the above described curable composition is of the two-component type, it is not necessary to blend a curing catalyst with the main component containing a reactive silicon group-containing polymer, and hence there is little fear of gelation even when some moisture is contained in the blended components; however, when a long term storage stability is required, it is preferable to carry out dehydration and drying. As for the methods of dehydration and drying, a thermal drying method is suitable for a powdery solid substance or the like, while a reduced pressure dehydration method or a dehydration method which uses a synthetic zeolite, active alumina, silica gel, quick lime or magnesium oxide is suitable for a liquid substance. Additionally, there can be adopted a method in which a small amount of an isocyanate compound is added to make its isocyanate group react with water for dehydration, or a method in which an oxazolidine compound such as 3-ethyl-2-methyl-2-(3-methylbutyl)-1,3-oxazolidine is added to make it react with water for dehydration. In addition to these dehydration and drying methods, addition of the following compounds further improves the storage stability: lower alcohols such as methanol and ethanol; and alkoxysilane compounds such as n-propyltrimethoxysilane, vinyltrimethoxysilane, vinylmethyldimethoxysilane, methylsilicate, ethylsilicate, γ-mercaptopropylmethyldimethoxysilane, γ-mercaptopropylmethyldiethoxysilane and γ-glycidoxypropyltrimethoxysilane.

It is particularly preferable that the used amount of a dehydrating agent, in particular, a silicon compound capable of reacting with water such as vinyltrimethoxysilane falls within a range from 0.1 to 20 parts by weight, and preferably 0.5 to 10 parts by weight with respect to 100 parts by weight of the reactive silicon group-containing organic polymer (A).

No particular constraint is imposed on the preparation method of the curable composition of the present invention; for example, there can be adopted a common method in which the above described components are blended together and kneaded with a mixer, a roll or a kneader at room temperature or under heating, or a common method in which the above described components are dissolved and mixed by use of a small amount of an appropriate solvent.

The curable composition of the present invention forms three dimensional networks when exposed to the air due to the action of the moisture to be cured into a solid matter having a rubber-like elasticity.

The curable composition of the present invention can be used as tackifiers, sealants for buildings, ships, vehicles and road, adhesives, mold forming materials, vibration-proof material, damping materials, soundproof materials, foaming materials, coating materials, spraying materials and the like. It is preferable that the cured article obtained by curing the curable composition of the present invention is used as a sealant and an adhesive because the cured article is excellent in flexibility and adhesion.

Additionally, the curable composition of the present invention can be used in various applications as liquid sealants to be used in materials for electric and electronic components such as backside sealants for solar cells, electric insulating materials such as insulating coating materials for use in electric wire and cable, elastic adhesives, contact type adhesives, spray type sealants, crack repairing materials, adhesives for tiling, powdery coating materials, casting materials, medical rubber materials, medical adhesives, medical instrument sealants, food packaging materials, sealants for joints in exterior materials such as sizing boards, coating materials, primers, electromagnetic wave shielding conductive materials, heat conducting materials, hot melt materials, electric and electronic potting agents, films, gaskets, various molding materials, antirust and waterproof sealants for edges (cut portions) of wire glass and laminated glass, vehicle components, electric appliance components, various machinery components and the like. Moreover, the curable composition of the present invention can adhere alone or in combination with a primer to a wide variety of substrates including glass, porcelain, woods, metals and molded resin articles, and accordingly, can be used as various types of sealing and adhesive compositions. Additionally, the curable composition of the present invention can be used as adhesives for interior panels, adhesive for exterior panels, adhesives for tiling, adhesives for stone tiling, adhesives for finishing ceiling, adhesives for finishing floor, adhesives for finishing wall, adhesives for vehicle panels, adhesives for assembling electric, electronic and precision instruments, sealants for direct glazing, sealants for double glazing, sealants for the SSG technique and sealants for working joints of buildings.

EXAMPLES

In the next place, the present invention is specifically described on the basis of examples and comparative examples, but the present invention is not limited by these examples and comparative examples.

Synthesis Example 1

By use of a polyoxypropylene triol having a molecular weight of about 3,000 as an initiator and zinc hexacyanocobaltate-glyme complex as a catalyst, polymerization of propylene oxide was carried out to yield a polypropylene oxide having a number average molecular weight of about 26,000 (a molecular weight relative to polystyrene standard measured by using a HLC-8120 GPC manufactured by Tosoh Corp. as a liquid delivery system, a column of TSK-GEL H-type manufactured by Tosoh Corp., and THF as a solvent). Then, a methanol solution of NaOMe was added in an amount of 1.2 equivalents with respect to the hydroxy group of the above hydroxy group-terminated polypropylene oxide, the methanol was distilled off, and allyl chloride was further added to thereby convert the terminal hydroxy group into an allyl group. The unreacted allyl chloride was distilled off under reduced pressure. To 100 parts by weight of the obtained crude allyl-terminated polypropylene oxide, 300 parts by weight of n-hexane and 300 parts by weight of water were added. The mixture thus obtained was stirred to mix, and then the water was removed by centrifugal separation. To the hexane solution thus obtained, 300 parts by weight of water was further added, the mixture thus obtained was stirred to mix, the water was again removed by centrifugal separation, and then the hexane was distilled off under reduced pressure. Thus, an allyl group-terminated trifunctional polypropylene oxide having a number average molecular weight of about 26,000 was obtained.

100 Parts by weight of the obtained allyl group-terminated polypropylene oxide and 1.1 parts by weight of methyldimethoxysilane were reacted at 90° C. for five hours by using, as a catalyst, 150 ppm of isopropanol solution of platinum-vinylsiloxane complex containing 3 wt % platinum to yield a polyoxypropylene polymer (A-1) terminated with methyldimethoxysilyl group. By measurement using $^1$H-NMR (measured in $CDCl_3$ as a solvent by use of a JNM-LA400 manufactured by JEOL Ltd.), the number of terminal methyldimethoxysilyl groups per molecule was 1.9 on average.

Examples 1 to 5 and Comparative Examples 1 to 7

100 Parts by weight of the reactive silicon group-containing polyoxyalkylene polymer (A-1) obtained in Synthesis Example 1 as the component (A), 50 parts by weight of a surface-treated colloidal calcium carbonate (Hakuenka CCR produced by Shiraishi Kogyo Kaisha, Ltd.), and as a photostabilizer, 2,4-di-t-butylphenyl-3,5'-di-t-butyl-4'-hydroxybenzoate (Sumisorb 400 produced by Sumitomo Chemical Co., Ltd.),bis(1,2,2,6,6-pentamethyl-4-piperidyl)sebacate (SANOL LS-765 produced by Sankyo Co., Ltd.), bis(2,2,6,6-tetramethyl-4-piperidyl)sebacate (SANOL LS-770 produced by Sankyo Co., Ltd.) or 2,4-di-tert-butyl-6-(5-chloro-2H-benzotriazole-2-yl)phenol (TINUVIN 327 produced by Ciba-Geigy Japan Ltd.) in a part by weight shown in Table 1 were weighed out; then, these ingredients were fully kneaded together with a three-roll paint mill to yield each main component.

Then titanium diisopropoxidebis(ethylacetoacetate) (Orgatix TC-750 of Matsumoto Trading Co., Ltd.), titanium diisopropoxidebis(acetylacetonate) (Orgatix TC-100 of Matsumoto Trading Co., Ltd.) (containing 25 wt % isopropyl alcohol) or dibutyltin bis(acetylacetonate) (Neostann U-220 produced by Nitto Kasei Kaisha, Ltd.) was weighed out respectively and mixed to the above described main component according to the formulations shown in Table 1. Then, the mixtures thus obtained were stirred with a spatula for 3 minutes to mix together. (The parts by weight of the titanium catalyst was adjusted so that the number of moles of titanium atoms in the composition became the same.) A color of the surface of the composition after the mixing was observed with naked eyes. Additionally, after mixing, the thus obtained compositions each were filled in a molding frame of about 5 mm in thickness with the aid of a spatula, and the surface of each of the filled compositions was fully flattened. The planarization completion time was set as the curing starting time; the surface of each of the compositions was touched with a spatula, and the skin formation time was measured as the time when the composition no longer stuck to the spatula. The skin formation time was measured at 23° C. at 50% RH.

Components of the composition, and the results of evaluation of color of the composition and skin formation time are shown in Table 1.

TABLE 1

| Composition (parts by weight) | | Example | | | | |
|---|---|---|---|---|---|---|
| | | 1 | 2 | 3 | 4 | 5 |
| Organic polymer | A-1 | 100 | 100 | 100 | 100 | 100 |
| Filler | Hakuenka CCR | 50 | 50 | 50 | 50 | 50 |
| Non-benzotriazole photostabilizer | Sumisorb 400 | 1 | | | 1 | 1 |
| | SANOL LS-765 | | 1 | | 1 | 1 |
| | SANOL LS-770 | | | 1 | | |
| Benzotriazole photostabilizer | TINUVIN 327 | | | | | 0.01 |
| Titanium diisopropoxidebis(ethylacetoacetate) | TC-750 | 2.1 | 2.1 | 2.1 | 2.1 | 2.1 |
| Titanium diisopropoxidebis(acetylacetonate) | TC-100 | | | | | |
| Dibutyltin bis(acetylacetonate) | U-220 | | | | | |
| Color of composition | | white | white | white | white | white |
| Skin formation time | (min) | 20 | 25 | 55 | 25 | 30 |

| Composition (parts by weight) | | Comparative Example | | | |
|---|---|---|---|---|---|
| | | 1 | 2 | 3 | 4 |
| Organic polymer | A-1 | 100 | 100 | 100 | 100 |
| Filler | Hakuenka CCR | 50 | 50 | 50 | 50 |
| Non-benzotriazole photostabilizer | Sumisorb 400 | | | 1 | 1 |
| | SANOL LS-765 | | | 1 | |
| | SANOL LS-770 | | 1 | | |

TABLE 1-continued

| | | | | | |
|---|---|---|---|---|---|
| Benzotriazole photostabilizer | TINUVIN 327 | 1 | 1 | | |
| Titanium diisopropoxidebis(ethylacetoacetate) | TC-750 | 2.1 | 2.1 | | |
| Titanium diisopropoxidebis(acetylacetonate) | TC-100 | | | 2.4 | |
| Dibutyltin bis(acetylacetonate) | U-220 | | | | 1 |
| Color of composition | | yellow | yellow | light yellow | white |
| Skin formation time | (min) | 250 | 380 | 230 | 20 |

| | | Comparative Example | | |
|---|---|---|---|---|
| Composition (parts by weight) | | 5 | 6 | 7 |
| Organic polymer | A-1 | 100 | 100 | 100 |
| Filler | Hakuenka CCR | 50 | 50 | 50 |
| Non-benzotriazole photostabilizer | Sumisorb 400 | | | |
| | SANOL LS-765 | 1 | | |
| | SANOL LS-770 | | 1 | |
| Benzotriazole photostabilizer | TINUVIN 327 | | | 1 |
| Titanium diisopropoxidebis(ethylacetoacetate) | TC-750 | | | |
| Titanium diisopropoxidebis(acetylacetonate) | TC-100 | | | |
| Dibutyltin bis(acetylacetonate) | U-220 | 1 | 1 | 1 |
| Color of composition | | white | white | white |
| Skin formation time | (min) | 20 | 20 | 20 |

As shown in Table 1, when the organotin catalyst (U-220) is used as a curing catalyst (Comparative Examples 4 to 7), curability (skin formation time) is equal and does not depend on a kind of a photostabilizer. The compositions (Comparative Examples 1 to 2) containing the titanium chelate (TC-750) of the component (B) and the photostabilizer having a benzotriazole ring is colored yellow and curability is not good. On the other hand, with respect to the compositions (Examples 1 to 5) containing the titanium chelate (TC-750) of the component (B) as a curing catalyst, less than 0.1 part by weight of the photostabilizer having a benzotriazole ring and the photostabilizer having no benzotriazole ring, color thereof is white and curability is satisfactory. Also the composition (Comparative Example 3) prepared using TC-100 as a titanium catalyst other than the component (B) is colored light yellow and curability is not good.

Synthesis Example 2

An allyl group-terminated polypropylene oxide was obtained in the same manner as in Synthesis Example 1 by using a hydroxyl group-terminated polypropylene oxide having a number average molecular weight of about 25,500 and obtained by polymerizing propylene oxide by use of polyoxypropylene glycol having a molecular weight of about 2,000 as an initiator and zinc hexacyanocobaltate-glyme complex as a catalyst. This allyl group-terminated polypropylene oxide was reacted with 0.9 part by weight of methyldimethoxysilane in the same manner as in Synthesis Example 1 to yield a polyoxypropylene polymer (A-2) having 1.3 terminal methyldimethoxysilyl groups on average.

Synthesis Example 3

An allyl group-terminated polypropylene oxide was obtained in the same manner as in Synthesis Example 1 by using a hydroxyl group-terminated polypropylene oxide having a number average molecular weight of about 19,000 and obtained by polymerizing propylene oxide by use of a 1/1 (weight ratio) mixture of a polyoxypropylene diol having a molecular weight of about 2,000 and a polyoxypropylene triol having a molecular weight of about 3,000 as an initiator and zinc hexacyanocobaltate-glyme complex as a catalyst. This allyl group-terminated polypropylene oxide was reacted with 1.35 parts by weight of methyldimethoxysilane in the same manner as in Synthesis Example 1 to yield a polyoxypropylene polymer (A-3) having 1.7 terminal methyldimethoxysilyl groups on average.

Synthesis Example 4

To a 2-butanol solution of the following monomer mixture heated to 105° C. was added dropwise over five hours a solution prepared by dissolving 2,2'-azobis(2-methylbutyronitrile) as a polymerization initiator, followed by one-hour "post-polymerization" to yield a (meth)acrylate polymer (A-4).

46.8 parts by weight of methyl methacrylate, 28.6 parts by weight of butyl acrylate, 20.1 parts by weight of stearyl methacrylate, 4.5 parts by weight of γ-methacryloxypropyldimethoxymethylsilane and 2.7 parts by weight of 2,2'-azobis(2-methylbutyronitrile).

Synthesis Example 5

After mixing the polymer (A-3) obtained in Synthesis Example 3 and the polymer (A-4) obtained in Synthesis Example 4 at 80/20 in a weight ratio of solid contents, a solvent was distilled off to yield a solvent-free polymer (A-5).

Synthesis Example 6

To a 2-butanol solution of the following monomer mixture heated to 105° C. was added dropwise over five hours a solution prepared by dissolving 2,2'-azobis(2-methylbutyronitrile) as a polymerization initiator, followed by one-hour "post-polymerization" to yield a (meth)acrylate polymer (A-6).

72.9 parts by weight of methyl methacrylate, 6.5 parts by weight of butyl acrylate, 14.6 parts by weight of stearyl methacrylate, 6 parts by weight of γ-methacryloxypropyldimethoxymethylsilane, 7.9 parts by weight of mercaptopropyldimethoxymethylsilane and 3 parts by weight of 2,2'-azobis(2-methylbutyronitrile).

Synthesis Example 7

After mixing the polymer (A-3) obtained in Synthesis Example 3 and the polymer (A-6) obtained in Synthesis Example 6 at 60/40 in a weight ratio of solid contents, a solvent was distilled off to yield a solvent-free polymer (A-7).

Examples 6 to 12 and Comparative Examples 8 to 9

100 Parts by weight of the reactive silicon group-containing organic polymer (A-2, A-5, A-7) obtained in Synthesis Example 2, 5 or 7, 120 parts by weight of a surface-treated colloidal calcium carbonate (Hakuenka CCR produced by Shiraishi Kogyo Kaisha, Ltd.), 20 parts by weight of a titanium oxide (Tipaque R-820 produced by Ishihara Sangyo Kaisha, Ltd.), 55 parts by weight of a plasticizer: diisodecyl phthalate (SANSOCIZER DIDP produced by New Japan Chemical Co., Ltd.), 2 parts by weight of a thixotropy-imparting agent (Disparlon 6500 produced by Kusumoto Chemicals, Ltd.), 2,4-di-t-butylphenyl-3,5-di-t-butyl-4-hydroxybenzoate (Sumisorb 400 produced by Sumitomo Chemical Co., Ltd.), bis(1,2,2,6,6,-pentamethyl-4-piperidyl)sebacate (Sanol LS-765 produced by Sankyo Co., Ltd.), bis(2,2,6,6,-tetramethyl-4-piperidyl)sebacate (Sanol LS-770 produced by Sankyo Co., Ltd.), the following compound:

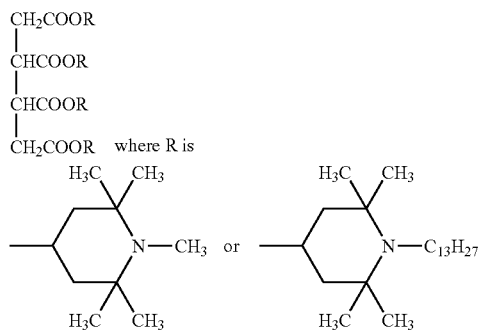

(ADEKA STAB LA-62 produced by ADEKA CORPORATION), 2-(4,6-diphenyl-1,3,5-triazine-2-yl)-5-(hexyloxy)phenol (TINUVIN 1577FF produced by Ciba-Geigy Japan Ltd.) or 2,4-di-tert-butyl-6-(5-chloro-2H-benzotriazole-2-yl)phenol (TINUVIN 327 produced by Ciba-Geigy Japan Ltd.) in a part by weight shown in Table 1 as a photostabilizer, 1 part by weight of an antioxidant (Irganox 1010 produced by Ciba-Geigy Japan Ltd.), 2 parts by weight of vinyltrimethoxysilane (A-171 produced by Toray Dow Corning Co., Ltd.), 3 parts by weight of N-(β-aminoethyl)-γ-aminopropyltrimethoxysilane (A-1120 produced by Toray Dow Corning Co., Ltd.), and as a curing catalyst, 8.5 parts by weight of titanium diisopropoxidebis(ethylacetoacetate) (Orgatix TC-750 of Matsumoto Trading Co., Ltd.) of the component (B) were added according to the formulations shown in Table 2. Then the mixture was kneaded under dehydrating condition in a state substantially free from moisture and sealed in a moisture-proof vessel (cartridge) to yield one-component type curable compositions.

The one-component type curable compositions each were extruded from the cartridge, and color of the surface of the compositions was observed with naked eyes. The extruded compositions each were filled in a molding frame of about 3 mm in thickness with a spatula and the surface of each of the filled compositions was fully flattened. The compositions each were aged at 23° C. for three days and additionally aged at 50° C. for four days, and the obtained sheet-like 3 mm thick cured samples were exposed for 300 hours in a SWOM weather resistance tester. Then the samples were taken out and the surface thereof were observed. A sample having abnormality such as cracking on its surface is evaluated as "B", and a sample having no abnormality is evaluated as "A".

Components of the composition, and the results of evaluation of color of the composition and SWOM weather resistance are shown in Table 2.

TABLE 2

| Compositions (part by weight) | | Example | | | | |
|---|---|---|---|---|---|---|
| | | 6 | 7 | 8 | 9 | 10 |
| Organic polymer | A-2 | 100 | 100 | 100 | 100 | 100 |
| | A-5 | | | | | |
| | A-7 | | | | | |
| Filler | Hakuenka CCR | 120 | 120 | 120 | 120 | 120 |
| | Tipaque R-820 | 20 | 20 | 20 | 20 | 20 |
| Plasticizer | SANSOCIZER DIDP | 55 | 55 | 55 | 55 | 55 |
| Thixotropy-imparting agent | Disparlon #6500 | 2 | 2 | 2 | 2 | 2 |
| Non-benzotriazole photostabilizer | Sumisorb 400 | 1 | | 1 | 1 | |
| | Sanol LS-765 | 1 | 1 | | | |
| | Sanol LS-770 | | | 1 | | |
| | ADEKA STAB LA-62 | | | | 1 | |
| | TINUVIN 1577FF | | | | | 1 |
| Benzotriazole photostabilizer | TINUVIN 327 | | | | | |
| Antioxidant | Irganox 1010 | 1 | 1 | 1 | 1 | 1 |
| Dehydrating agent | A-171 | 2 | 2 | 2 | 2 | 2 |
| Adhesion-imparting agent | A-1120 | 3 | 3 | 3 | 3 | 3 |
| Titanium catalyst | TC-750 | 8.5 | 8.5 | 8.5 | 8.5 | 8.5 |
| Color of composition | | white | white | white | white | white |
| Weather resistance | | A | A | A | A | A |

TABLE 2-continued

|  |  | Example | | Comparative Example | |
|---|---|---|---|---|---|
| Compositions (part by weight) |  | 11 | 12 | 8 | 9 |
| Organic polymer | A-2 |  |  | 100 | 100 |
|  | A-5 | 100 |  |  |  |
|  | A-7 |  | 100 |  |  |
| Filler | Hakuenka CCR | 120 | 120 | 120 | 120 |
|  | Tipaque R-820 | 20 | 20 | 20 | 20 |
| Plasticizer | SANSOCIZER DIDP | 55 | 55 | 55 | 55 |
| Thixotropy-imparting agent | Disparlon #6500 | 2 | 2 | 2 | 2 |
| Non-benzotriazole photostabilizer | Sumisorb 400 | 1 | 1 |  |  |
|  | Sanol LS-765 | 1 | 1 | 1 |  |
|  | Sanol LS-770 |  |  |  |  |
|  | ADEKA STAB LA-62 |  |  |  |  |
|  | TINUVIN 1577FF |  |  |  |  |
| Benzotriazole photostabilizer | TINUVIN 327 |  |  | 1 |  |
| Antioxidant | Irganox 1010 | 1 | 1 | 1 | 1 |
| Dehydrating agent | A-171 | 2 | 2 | 2 | 2 |
| Adhesion-imparting agent | A-1120 | 3 | 3 | 3 | 3 |
| Titanium catalyst | TC-750 | 8.5 | 8.5 | 8.5 | 8.5 |
| Color of composition |  | white | white | yellow | white |
| Weather resistance |  | A | A | A | B |

As shown in Table 2, the composition (Comparative Example 8) containing the photostabilizer having a benzotriazole ring is colored yellow, and the composition (Comparative Example 9) containing no photostabilizers at all shows poor weather resistance. On the other hand, the compositions (Examples 6 to 12) which does not contain a photostabilizer having a benzotriazole ring and contains a photostabilizer having no benzotriazole ring is white and shows satisfactory weather resistance.

Further, the following adhesion test was carried out using the one-component type curable composition of Example 6. The curable composition was extruded from the cartridge so that the composition was adhered to an article to be adhered (polycarbonate, acrylic resin) to produce a sample. The obtained sample was aged at 23° C. for 7 days and was subjected to a 90 degree hand peel test to evaluate adhesion thereof. As a result, the sample showed the cohesion failure with respect to all the article to be adhered.

The invention claimed is:

1. A curable composition comprising:
(A) an organic polymer having a silicon-containing group capable of crosslinking by siloxane bond formation, which polymer is a polyoxyalkylene polymer and/or a (meth)acrylate polymer,
(B) a titanium chelate represented by the following general formula (1) or (2), and
(C) a photostabilizer,
wherein a main component of the photostabilizer (C) is a photostabilizer (C-1) having no benzotriazole ring General formula (1):

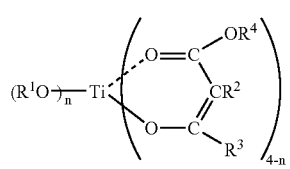

wherein each of n $R^1$s is independently a substituted or unsubstituted hydrocarbon group having 1 to 20 carbon atoms, each of (4-n) $R^2$s is independently hydrogen atom or a substituted or unsubstituted hydrocarbon group having 1 to 20 carbon atoms, each of (4-n) $R^3$s and (4-n) $R^4$s is independently a substituted or unsubstituted hydrocarbon group having 1 to 20 carbon atoms, n is 0, 1, 2 or 3;

General formula (2):

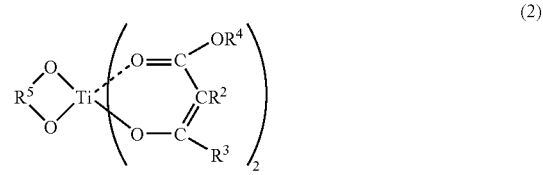

wherein $R^2$, $R^3$ and $R^4$ are the same as defined above, $R^5$ is a substituted or unsubstituted divalent hydrocarbon group having 1 to 20 carbon atoms.

2. The curable composition according to claim 1, wherein a photostabilizer (C-2) having a benzotriazole ring is not contained as the photostabilizer (C).

3. The curable composition according to claim 1, wherein a minor component of the photostabilzer (C) comprises a photostabilizer (C-2) having a benzotriazole ring and the content of the (C-2) is less than 0.1 part by weight with respect to 100 parts by weight of the polymer (A).

4. The curable composition according to claim 1, wherein said polymer (A) is a polyoxypropylene polymer and/or (meth)acrylate polymer.

5. The curable composition according to claim 1, wherein the glass transition temperature of the polymer (A) is not more than 20° C.

6. The curable composition according to claim 1, wherein said photostabilizer (C-1) having no benzotriazole ring is one or more kinds selected from benzoate ultraviolet absorbers, triazine ultraviolet absorbers, cyano acrylate ultraviolet absorbers, benzophenone ultraviolet absorbers and hindered amine photostabilizers.

7. The curable composition according to claim 1, wherein said photostabilizer (C-1) having no benzotriazole ring is a benzoate ultraviolet absorber and/or a hindered amine photostabilizer.

8. The curable composition according to claim 6, wherein said hindered amine photostabilizer is a hindered amine photostabilizer having no —NH— group.

9. The curable composition according to claim 1, wherein with respect to 100 parts by weight of the polymer (A), the titanium chelate (B) is contained in an amount of from 0.1 to 20 parts by weight and the photostabilizer (C-1) having no benzotriazole ring is contained in an amount of from 0.1 to 10 parts by weight.

10. The curable composition according to claim 2, wherein said polymer (A) is a polyoxypropylene polymer and/or (meth)acrylate polymer.

11. The curable composition according to claim 3, wherein said polymer (A) is a polyoxypropylene polymer and/or (meth)acrylate polymer.

12. The curable composition according to claim 2, wherein the glass transition temperature of the polymer (A) is not more than 20° C.

13. The curable composition according to claim 3, wherein the glass transition temperature of the polymer (A) is not more than 20° C.

14. The curable composition according to claim 4, wherein the glass transition temperature of the polymer (A) is not more than 20° C.

15. The curable composition according to claim 2, wherein said photostabilizer (C-1) having no benzotriazole ring is one or more kinds selected from benzoate ultraviolet absorbers, triazine ultraviolet absorbers, cyano acrylate ultraviolet absorbers, benzophenone ultraviolet absorbers and hindered amine photostabilizers.

16. The curable composition according to claim 3, wherein said photostabilizer (C-1) having no benzotriazole ring is one or more kinds selected from benzoate ultraviolet absorbers, triazine ultraviolet absorbers, cyano acrylate ultraviolet absorbers, benzophenone ultraviolet absorbers and hindered amine photostabilizers.

17. The curable composition according to claim 4, wherein said photostabilizer (C-1) having no benzotriazole ring is one or more kinds selected from benzoate ultraviolet absorbers, triazine ultraviolet absorbers, cyano acrylate ultraviolet absorbers, benzophenone ultraviolet absorbers and hindered amine photostabilizers.

18. The curable composition according to claim 5, wherein said photostabilizer (C-1) having no benzotriazole ring is one or more kinds selected from benzoate ultraviolet absorbers, triazine ultraviolet absorbers, cyano acrylate ultraviolet absorbers, benzophenone ultraviolet absorbers and hindered amine photo stabilizers.

19. A sealant comprising said curable composition according to claim 1.

20. An adhesive comprising said curable composition according to claim 1.

* * * * *